(12) United States Patent
Hong et al.

(10) Patent No.: US 12,498,050 B2
(45) Date of Patent: Dec. 16, 2025

(54) VALVE APPARATUS

(71) Applicant: THE PROTECTOSEAL COMPANY, Bensenville, IL (US)

(72) Inventors: Daomin Hong, Flintshire (GB); Lewis Bingham, Flintshire (GB)

(73) Assignee: THE PROTECTOSEAL COMPANY, Bensenville, IL (US)

( * ) Notice: Subject to any disclaimer, the term of this patent is extended or adjusted under 35 U.S.C. 154(b) by 0 days.

(21) Appl. No.: 18/384,980

(22) Filed: Oct. 30, 2023

(65) Prior Publication Data

US 2024/0077142 A1 Mar. 7, 2024

Related U.S. Application Data

(63) Continuation of application No. 16/637,214, filed as application No. PCT/GB2018/051319 on May 16, 2018, now Pat. No. 11,802,626.

(30) Foreign Application Priority Data

May 16, 2017 (GB) ..................................... 1707857

(51) Int. Cl.
*F16K 17/04* (2006.01)
*F16K 15/06* (2006.01)

(52) U.S. Cl.
CPC ........ *F16K 17/0413* (2013.01); *F16K 15/066* (2013.01); *F16K 17/048* (2013.01); *Y10T 137/7838* (2015.04)

(58) Field of Classification Search
CPC .. F16K 17/0413; F16K 15/066; F16K 17/048; F16K 17/19; F16K 17/196; Y10T 137/7838; Y10T 137/7839
See application file for complete search history.

(56) References Cited

U.S. PATENT DOCUMENTS 2,091,907 A 8/1937 Blom
2,137,882 A 11/1938 Nelson
(Continued)

FOREIGN PATENT DOCUMENTS

CN 2 083 668 U 8/1991
CN 201 099 499 Y 8/2008
(Continued)

OTHER PUBLICATIONS

PCT/GB2018/051319—International Search Report, Sep. 6, 2018.
(Continued)

*Primary Examiner* — Craig M Schneider
(74) *Attorney, Agent, or Firm* — Curatolo Sidoti & Trillis Co., LPA; Floyd Trillis, III; Salvatore A. Sidoti

(57) ABSTRACT

A valve apparatus [11] for connection to a tank or pipe, the valve apparatus[11] comprises a housing [12], a first opening [176a] and a second opening [177a] communicating with respective first conduit [16] and second conduit [17] each for providing ingress and egress of fluid into and out of the housing [11] through the first opening [176a] and the second opening [177a], and discrete first and second valve means or valves [14; 15] which are spaced apart from one another, the first and second valve means or valves [14; 15] selectively controlling fluid flow between the first and second conduits [16; 17], wherein, in use, the principal flow axes along the first conduit [16] and second conduit [17] are parallel and opposed, the first valve means or valve [14] is configured to open when the pressure in the first conduit [16] is greater than a first pressure and the second valve means or valve [14; 15] is configured to open when the pressure in the first conduit [16] is less than the first pressure.

17 Claims, 10 Drawing Sheets

(56) References Cited

U.S. PATENT DOCUMENTS

| | | | |
|---|---|---|---|
| 2,304,991 A | 12/1942 | Foster | |
| 2,388,395 A | 11/1945 | Duggan | |
| 3,981,317 A | 9/1976 | Strulik et al. | |
| 4,284,097 A | 8/1981 | Becket et al. | |
| 4,519,301 A | 5/1985 | Wetzel | |
| 4,555,041 A | 11/1985 | Muehl | |
| 4,593,711 A | 6/1986 | Morris | |
| 5,905,227 A | 5/1999 | Eichert et al. | |
| 5,918,619 A | 7/1999 | Woods et al. | |
| 6,409,779 B2 | 6/2002 | Leinemann et al. | |
| 6,910,871 B1 | 6/2005 | Blume | |
| 8,147,227 B1 | 4/2012 | Blume | |
| 10,151,239 B1 | 12/2018 | Kafka et al. | |
| 2003/0000577 A1 | 1/2003 | Noll et al. | |
| 2003/0235508 A1 | 12/2003 | Vicars | |
| 2004/0134537 A1 | 7/2004 | Noll et al. | |
| 2005/0211299 A1 | 9/2005 | Tripp | |
| 2005/0229975 A1 | 10/2005 | Moe et al. | |
| 2006/0076062 A1 | 4/2006 | Andersson | |
| 2007/0204916 A1 | 9/2007 | Clayton et al. | |
| 2010/0218958 A1* | 9/2010 | Cooling | A62C 4/02 169/45 |
| 2012/0251366 A1 | 10/2012 | Kuroyanagi et al. | |
| 2014/0360590 A1 | 12/2014 | Bertoldi et al. | |
| 2015/0198257 A1 | 7/2015 | Kelm et al. | |
| 2016/0178076 A1 | 6/2016 | Cellemme et al. | |
| 2016/0305653 A1 | 10/2016 | Fields et al. | |
| 2016/0346575 A1 | 12/2016 | Hong et al. | |
| 2016/0361581 A1 | 12/2016 | Riordan | |
| 2018/0209556 A1 | 7/2018 | Fisher | |

FOREIGN PATENT DOCUMENTS

| | | | |
|---|---|---|---|
| CN | 201 442 728 U | 4/2010 | |
| CN | 201442728 * | 4/2010 | ............ B65D 90/22 |
| CN | 201 475 454 U | 5/2010 | |
| FR | 905942 A | 7/1944 | |
| FR | 1172661 A | 2/1959 | |
| WO | WO 91/09244 A1 | 6/1991 | |
| WO | WO 93/16310 A1 | 8/1993 | |
| WO | WO 97/48926 A2 | 12/1997 | |
| WO | WO 2016/051209 A1 | 4/2016 | |

OTHER PUBLICATIONS

PCT/GB2018/051319—International Written Opinion, Sep. 6, 2018.
GB1707857.7—Great Britain Search Report, Nov. 3, 2017.
GB1807920.2—Great Britain Search Report, Nov. 12, 2018.

\* cited by examiner

VALVE APPARATUS

CROSS REFERENCE TO RELATED APPLICATIONS

This application is a continuation application of U.S. patent application Ser. No. 16/637,214, filed on Feb. 6, 2020, now U.S. Pat. No. 11,802,626, which is a national stage application of International Application No. PCT/GB2018/051319, filed May 16, 2018, which claims priority from Great Britain Patent Application No. 1707857.7, filed May 16, 2017.

This invention relates generally to valve apparatus. More specifically, although not exclusively, this invention relates to pressure and vacuum relief valve apparatus.

BACKGROUND OF THE INVENTION

Numerous industries, for example the petrochemical industry and the distillery industry, require the prevention of the build-up of excessive positive or negative pressures within a pipe or container (for example a tank, storage tank or storage vessel). Accordingly, it is known to provide valve means on such pipes or containers, where the valve means is configured to allow the flow of fluid out of the pipe or container if the pressure of the fluid therewithin exceeds a pre-set maximum value or to allow a flow of fluid in to the pipe or container if the pressure of the fluid therewithin is less than a pre-set minimum value. If fluid is allowed to leave the pipe or container that is called an out-breathing mode, if fluid is allowed to enter the pipe or container that is known as an inbreathing mode. Of course, out-breathed fluids will comprise the fluids contained within the pipe or container whereas in-breathed fluids will comprise those fluids without the pipe or container and will typically be air (or an inert gas).

Furthermore, a vapour cloud may form a combustible or explosive atmosphere in the vicinity of industrial equipment. Such a combustible or explosive vapour cloud may be generated, at least in part, by fluid vented through valve means as described above. An ignition of this vapour cloud (due to sparks, lightning, static electricity etc.) will initiate an atmospheric deflagration or a vapour cloud explosion. Where the vapour cloud is in the vicinity of valve means as described above, and those valve means are in an open condition, the deflagration or explosion may enter the pipe or container on which the valve means is disposed. The contents of the pipe or container may then become subject to deflagration or explosion and/or the contents of further piping or containers connected thereto, for example in a downstream (in the direction of flame propagation) tank system. Typical installations in which such events may be encountered include tank venting systems, e.g. storage tanks.

Flame arresters represent one solution to the challenge of mitigating the risk of deflagration and/or explosion propagation. A flame arrester comprises a flame arrester element which may be constructed from a porous matrix, for example a crimped ribbon, which allows gas or vapour to flow through the flame arrester. The flame arrester element is designed principally to prevent flame transmission in the event of an explosion.

A valve apparatus may be integrated with a flame arrester. The valve apparatus may comprise a housing, a flame arrester element, a pressure relief valve and a vacuum relief valve, where the flame arrester element is located within the housing. The flame arrester is typically an end-of-line (EOL) device, designed to protect plant and equipment from an externally ignited atmospheric deflagration. The flame arrester element is designed to prevent a flame front from entering into, and propagating through, a piping system attachable to the valve apparatus' inlet. The valves control fluid communication between the inlet and an outlet, wherein the flame arrester element is disposed. The principal flow axis through the inlet is typically perpendicular to the principal flow axis through the outlet. The flame arrester element is provided on one side of the valve apparatus and is covered by a weather hood designed to protect the flame arrester element from damage from atmospheric contaminants. The pressure relief valve and vacuum relief valve are biased toward a closed condition by the mass of the valve plates or pallets of each valve. Accordingly, such a valve apparatus must be installed in a vertical orientation.

Flame arresters can be susceptible to becoming blocked. Such blockages may occur in a number of different ways: for example, airborne solids may be deposited on the face of the flame arrester element, moisture may condense and freeze on the flame arrester element surface under the right meteorological conditions, and flame arrester elements may also be attractive for nesting birds and bees/wasps which can cause partial or total blockage to the vent system. If a flame arrester becomes even partially blocked, the flame arrester flow capacity will be reduced and, in extreme cases, there will be a serious risk of catastrophic damage to equipment (for example, to storage tanks during filling and emptying or as a result of weather changes). Moreover, the pressure drop across the flame arrester will likely increase leading to suboptimal performance.

Accordingly, regular maintenance and inspections are vital to prevent blockage of the flame arrester element and to ensure that it operates effectively under normal flow conditions and also in the event of an explosion. A common problem experienced with conventional EOL flame arresters, such as that described above, concerns the routine maintenance and visual inspection of the flame arrester element, which is hidden from view by the weather hood. This issue is exacerbated when the flame arrester is installed at a location significantly elevated above ground level, as is common.

An alternative valve apparatus may be integrated with a flame arrester such that the valve apparatus is provided with plural flame arrester elements. The alternative valve apparatus includes a housing, a pressure relief valve and a vacuum relief valve. This valve apparatus includes an inlet, a vacuum relief inlet and an outlet. The vacuum relief valve controls fluid communication between the inlet and the vacuum relief inlet, with a first flame arrester element disposed therewithin. The pressure relief valve controls fluid communication between the inlet and the outlet, with a second flame arrester element disposed therewithin. A drainage outlet including a third flame arrester element is located within the housing, downstream of the pressure relief valve. The alternative valve apparatus must also be installed in the vertical orientation, for similar reasons to those discussed in respect of the previously described valve apparatus.

The alternative valve apparatus includes a flame arrester element, which is not visible during use, and consequently this design suffers for reasons similar to those set out in respect of the previously described valve apparatus. Furthermore, the provision of plural flame arrester elements provides a relatively more complex design, thereby including more components which may be susceptible to failure prior to or during use. Moreover, commonly flame arrester elements may be removed for maintenance and/or replacement. Such removal is more complex and time consuming where plural flame arrester elements are included instead of a single flame arrester element.

A further valve apparatus is described in WO93/16310. It will be appreciated that the weight distribution is asymmetrical.

Valve apparatus of the described types are commonly installed at a location significantly elevated above ground level, as explained above. The balance, weight and/or compactness of such valve apparatus is therefore of vital importance in order that they are suitable for installation at such locations. The above described valve apparatus (in particular the alternative and further valve apparatus) have an imbalanced weight distribution (with respect to the inlet) and consequently installation requires the installer to consider how the valve apparatus will operate in certain locations (e.g. locations exposed to strong winds and/or where a pipe connected to the inlet is relatively long) or may require a stronger mount than might otherwise be required.

DETAILED DESCRIPTION OF THE INVENTION

It is therefore a first non-exclusive object of the invention to provide a valve apparatus which at least partially mitigates the above-identified problems and/or has improved performance over prior art valve apparatus.

Accordingly, a first aspect of the invention provides a valve apparatus for connection to a pipe or container (e.g. tank, storage tank or storage vessel), the valve apparatus comprising a housing, a first opening and a second opening communicating with respective first and second conduits each for providing ingress and egress of fluid into and out of the housing through the first opening and the second opening, and discrete first and second valve means or valves which are spaced apart from one another, the first and second valve means or valves selectively controlling fluid flow between the first and second conduits, wherein, in use, the principal flow axes along the first conduit and second conduit are parallel and opposed, the first valve means or valve is configured to open when the pressure in the first conduit is greater than a first pressure and the second valve means or valve is configured to open when the pressure in the first conduit is less than the first pressure.

The invention thus provides a valve apparatus in which opening of the first and second valve means or valves is entirely independent. Consequently, opening of the first and/or second valve means or valves is not dependent on the proper functioning of the other valve means or valve. Therefore, advantageously, if the second valve means or valve fails (for whatever reason) the first valve means or valve will still function and will open if the pressure in the first conduit is greater than the first pressure, and vice versa.

One skilled in the art will appreciate that where the first and second valve means or valves are described as being discrete this is different to a valve mechanism in which the valve seat of one valve forms part of the valve plate or pallet of another valve (wherein the valves are not discrete).

In the valve apparatus according to the first aspect of the invention, when both valve means or valves are in a closed condition fluid may be prevented from flowing between the conduits. When the first valve means or valve is in an open condition thereby allowing fluid to flow from the first conduit to the second conduit the valve apparatus may be in an out-breathing mode or condition. When the second valve means or valve is in an open condition thereby allowing fluid to flow from the second conduit to the first conduit the valve apparatus may be in an in-breathing mode or condition.

The first and second valve means or valves may be spaced apart from one another by any suitable distance. The first valve means or valve may comprise a first valve member, for example a first valve plate or pallet, e.g. and a first valve seat. The second valve means or valve may comprise a second valve member, for example a second valve plate or pallet, e.g. and a second valve seat. The first and/or second valve plate or pallet may be configured to provide a fluid tight seal against, respectively, the first and/or second valve seat, for example in a closed condition or position. The first valve means or valve may comprise a pressure relief valve. The second valve means or valve may comprise a vacuum relief valve. The first valve plate or pallet and second valve plate or pallet may be substantially parallel to one another. The first and second valve plates or pallets may be substantially coaligned, e.g. substantially coaxial. The first and/or the second valve plates or pallets may be removably attached to, respectively, the first and second valve seats. The first and second valve means or valves (e.g. the first and second valve plates or pallets) may be aligned with one another, for example vertically (e.g. when the valve apparatus is installed at a site of use). The first valve means or valve (e.g. the first valve plate or pallet) may comprise a central axis, for example perpendicular to a major plane of, the first valve means or valve (e.g. the first valve plate or pallet). The second valve means or valve (e.g. the second valve plate or pallet) may comprise a central axis, for example perpendicular to a major plane of, the second valve means or valve (e.g. the second valve plate or pallet). The central axes of the first and second valve means or valves (e.g. the first and second valve plates or pallets) may be aligned. The first and/or second conduit may comprise a central axis, for example along which the principal flow axes extend. The central axis of the first and/or the second valve means or valve (e.g. the first and/or the second valve plate or pallet) may be aligned with the central axis of the first and/or the second conduit. Advantageously, such aligned valve means or valves and conduits provide a valve apparatus having relatively enhanced weight distribution. Alternatively, the second valve means or valve may be horizontally displaced from the first valve means or valve. In an embodiment, the second valve means or valve may comprise plural second valve plates or pallets. Preferably, the second valve means, e.g. the plural second valve plates or pallets are distributed symmetrically about the first valve means or valve.

The valve means or valve set, e.g. the first and/or second valve means or valve, may be configured to be biased in use toward a closed position or condition. The bias may be generated by a biasing means or biaser, for example a mass. The mass may be attached to, mounted to, associated with and/or comprise the first and/or second valve (e.g. the first and/or second valve plate or pallet). The first and/or second valve plate or pallet may comprise the mass. Additionally or alternatively, the biasing means or biaser may comprise a resilient biasing means or biaser, for example one or more springs or resilient elements or members (e.g. a member comprising elastomeric material).

The valve apparatus may comprise a seal or sealing means, for example configured to seal the valve means or valve set (e.g. to provide a seal between the first and/or second valve plate or pallet relative to, respectively, the first and/or second valve seat). The seal or sealing means may be configured to provide a fluid tight seal. The seal or sealing means may comprise one or more seals. In embodiments the one or more seals may comprise one or more air cushion seals. Advantageously, air cushion seals provide tight sealing thereby reducing evaporation losses and/or emissions through or by the seal. Accordingly, a low rate of leakage is achieved. The one or more seals may comprise a diaphragm, for example at least partially formed from PTFE or FEP.

The valve apparatus may comprise guide means or one or more guides, for example configured to guide, in use, the valve means or valve set (e.g. the first and/or second valve means or valves). The guide means or one or more guides may be configured to guide the first and/or second valve plate or pallet relative to its respective valve seat, e.g. thereby to ensure a correct seating of the valve(s). The guide means or one or more guides may comprise one or more cooperating projections and recesses. The, some or each projection may be configured to move within its cooperating recess when the valve means or valve set moves toward or away from an open and/or closed condition or position (e.g. when at least one part of the valve means or valve set moves toward or away from an open and/or closed condition or position). In embodiments the first valve plate or pallet and/or the second valve plate or pallet may comprise one, some or all of the one or more projections. In embodiments the first valve plate or pallet and/or the second valve plate or pallet may comprise one, some or all of the one or more recesses. The recesses may comprise a corresponding shape to that of the projections, in negative. The projections may be configured to slidably engage in or with the recesses, in use. The guide means or one or more guides may comprise outer guidance for the first and/or second valve plate(s) or pallet(s) and/or one or more central stabilizing stem(s), for example to provide alignment of the plate(s) or pallet(s) and to ensure tight sealing.

In this way the or each valve plate or pallet remains correctly aligned with respect to its respective valve seat, in use, and will be properly and tightly sealed thereagainst when in a closed position or condition.

The second conduit may be at least partially defined between the first conduit and the housing. The second conduit may surround (for example at least partially) the first conduit or an end thereof, e.g. may entirely surround the first conduit or an end thereof. The first and second conduits may be coaxial or may be eccentrically arranged.

The housing may be configured, in use, to cover the valve means or valve set (for example the first and second valve means or valves). Advantageously, the valve means or valve set (e.g. the first and second valve means or valves) is therefore protected from environmental conditions such as precipitation and/or wind. Accordingly, the valve means or valve set (for example the first and second valve means or valves) may function more reliably, e.g. in use. Moreover, the valve means or valve set (e.g. the first and second valve means or valves) is in fluid communication with the atmosphere around the valve apparatus. Therefore, the valve means or valve set (e.g. the first and second valve means or valves) functions reliably, in use.

The housing may comprise an end wall or portion, for example an openable or removable end wall or portion. The end wall or portion may be substantially perpendicular to the principal flow axes. The housing may comprise one or more side walls, for example surrounding and/or at least partially defining the second conduit. The side walls may extend at least partially around the first conduit, e.g. around an end thereof. The end wall or portion may be removably attached to the side walls or walls, for example by fixing means or fixings. The end portion may comprise a portion of the end wall, for example a removable portion of the end wall. The end portion may be removably attached to the fixed or non-removable portion of the end wall, for example by fixing means or fixings. The end wall or portion may comprise a greater area (e.g. have greater dimensions) than do the first and/or second valve plate or pallet (where provided). The fixing means or fixings may comprise one or more bolts and/or one or more flanges, for example extending from the end wall and/or the side wall or walls. The end wall (where provided) or portion may comprise a lifting eye or lug or ring nut or any other suitable attachment.

The end wall or portion that may be flat or in a dished-end form e.g. dome, may be configured (e.g. hinged lid) to automatically open as a pressure in the first conduit reaches a pre-set/pre-determined value or dangerous level for example due to some valve malfunctions or due to the blockage of flame arrester element or in an emergency case. Advantageously, the valve apparatus may operate as an emergency vent or emergency pressure relief device/valve to protect equipment, storage tanks or containers from overpressure damage.

Advantageously, removal or opening of the end wall or the removable portion thereof (where provided) allows rapid and ready access to the first and second valve plates or pallets, e.g. for visual inspection thereof. Consequently, the first and second valve plates or pallets may be readily and regularly inspected, for example for damage, and may be replaced when they are determined to no longer be fit for purpose.

The housing may comprise an interior chamber. Said valve means or valve set (e.g. the first and second valve means or valves) may be configured to allow fluid communication between the first conduit and the interior chamber. The valve means or valve set (e.g. the second valve means or valve) may be configured to allow fluid to flow, in use, from the interior chamber to the first conduit, e.g. when the pressure in the first conduit is less than the first pressure. The valve means or valve set (e.g. the first valve means or valve) may be configured to allow fluid to flow, in use, from the first conduit to the interior chamber, e.g. when the pressure in the first conduit is greater than the first pressure.

A second aspect of the invention provides a flame arrester comprising a first conduit for fluid flow, a housing, a flame arrester element and valve means or valve set, where the first conduit extends into the housing and the flame arrester element at least partially surrounds, and preferably completely surrounds, the first conduit, the flame arrester element extending between the first conduit and the housing, wherein said valve means or valve set is configured to allow a flow of fluid, in use, from the first conduit into the housing when the pressure in the first conduit is greater than a first pressure and from the housing into the first conduit when the pressure in the first conduit is less than the first pressure.

There is thus provided a flame arrester that is capable of allowing an increase or a decrease of pressure within the first conduit, thereby mitigating against potentially dangerous high or low pressures therewithin. Furthermore, the arrangement of the flame arrester element with respect to the first conduit provides for an even distribution of weight within the flame arrester. Advantageously, the flame arrester is therefore relatively stable when installed at the end of a pipe and/or at height. The valve means or valve set may comprise a pressure-relief valve and a vacuum-relief valve which are discrete. The pressure relief valve and vacuum relief valve will preferably be coaxially located. Alternatively, the pressure-relief valve (or vacuum-relief valve) will be located about the vacuum-relief valve (or pressure-relief valve).

The flame arrester element may be attached or attachable (e.g. removably) to the first conduit and/or the housing.

The flame arrester according to the second aspect of the invention may comprise a second conduit, for example which may be defined between the housing and the first conduit. The second conduit may surround the first conduit, e.g. entirely or partially surround the first conduit. The second conduit may be coaxial with the first conduit. Alternatively, the second conduit may be positioned eccentrically, e.g. non-axially aligned with the first conduit. The first conduit may have a principal flow axis extending therealong and/or the second conduit may have a principal flow axis extending therealong. The principal flow axes may be parallel, for example substantially parallel, to one another. The principal flow axes may be opposed, e.g. in opposite directions. The principal flow axis extending along the second conduit may extend through the flame arrester element. The valve means or valve set may comprise first and second valve means or valves, for example separate or discrete valve means or valves. The first and second valve means or valves may be configured to selectively open and close fluid communication between the first conduit and the second conduit or the flame arrester element. In use, the first valve means or valve may be configured to open when the pressure in the first conduit is greater than a first pressure. In use, the second valve means or valve may be configured to open when the pressure in the first conduit is less than the first pressure.

The first pressure may comprise a relatively high-pressure value. The second valve means or valve may be configured to open when the pressure in the first conduit is less than a second pressure. The second pressure may be less than the first pressure. The second pressure may comprise a relatively low-pressure value.

The first conduit may comprise, as the first opening, an outlet (e.g. when the valve apparatus is in an in-breathing mode), for example at an end thereof. The second conduit may comprise, as the second opening, an inlet (e.g. when the valve apparatus is in an in-breathing mode), for example at an end thereof. As will be readily understood, in an in-breathing mode fluid will flow through the second conduit and to the first conduit. At or adjacent its inlet the second conduit may have a total cross-sectional area of flow (e.g. a net free area of flow, for example an annular cross-sectional area) which may be between about 1.5 and about 3 times the cross-sectional area of the first conduit at or adjacent its outlet. The above-described cross-sectional areas may be perpendicular to the principal flow axes.

The first conduit may comprise a first end, e.g. and a second end. In an out-breathing mode the first end may provide, as the first opening, an inlet of the valve apparatus (or flame arrester), for example and the second opening may provide an outlet of the valve apparatus (or flame arrester). In an in-breathing mode the first end may provide, as the first opening, an outlet of the valve apparatus (or flame arrester), for example and the second opening may provide an inlet of the valve apparatus (or flame arrester). The first conduit may comprise a conduit wall. The first conduit may have a substantially constant cross-section along at least a portion of its length. The first conduit may comprise any suitable cross-sectional shape, for example a circle, oval, ellipse, rectangle, etc.

The first conduit may comprise attachment means or an attachment, e.g. for attachment to a site of use (where the site of use may comprise a container, tank, storage tank, storage vessel, pipe or a further conduit). The second conduit and/or the housing may comprise attachment means or an attachment, e.g. for attachment to the or a flame arrester element (where provided) and/or a support structure for a flame arrester element (such as a flame arrester element ring) and/or a support structure for a fluid permeable screen (for example a net, gauze or mesh or a perforated plate). The attachment means or attachment may be located at or adjacent the first end of the first conduit. The attachment means or attachment may comprise one or more securement means or securements, e.g. one or more bolts or screws. The attachment means or attachment may comprise one or more flanges, for example one or more flanges extending from or at least partially about the first conduit and/or the second conduit and/or the housing.

Provision of attachment means or an attachment allows the valve apparatus to be removably attached to a site of use, for example to a container, tank, storage tank, storage vessel, pipe or further conduit. Advantageously, the valve apparatus may be removably attached to a flame arrester element or to a structure containing or configured to retain a flame arrester element (for example a flame arrester element ring). The valve apparatus may therefore be reliably and rapidly replaced if it is found to be unsuitable for use, for example if it is damaged, blocked or otherwise provides vacuum and/or pressure relief at unsuitable pressures for the application to which it is intended. Moreover, the valve apparatus may be reliably and rapidly replaced by an end wall or another conduit if the configuration of the structure is altered. Moreover, the or a flame arrester element (where provided) may be readily removed or replaced.

In embodiments of the flame arrester the first valve plate or pallet may comprise the second valve plate or pallet, for example and the second valve seat.

The first valve means or valve may be relatively nearer to the first end of the first conduit than is the second valve means or valve, for example when both valve means or valves are in a closed position or condition. Alternatively, the second valve means or valve may be relatively nearer to the first end of the first conduit than is the first valve means or valve, for example when both valve means or valves are in a closed position or condition.

The valve apparatus (or flame arrester) may comprise an extension, e.g. which may comprise the second end of first conduit or may extend from or be attached or attachable to the second end of the first conduit. The extension may be configured to define a flow path between the first conduit and one of the first and second valve means or valves, for example where the flow path bypasses the other of the first and second valve means or valves.

The extension may extend beyond the flame arrester element (where provided). The valve means or valve set (e.g. the first valve means or valve) may be located or mounted to or attached at or adjacent or to the extension. The first valve seat (where provided) may comprise a portion of the extension, e.g. an end portion of the extension, and/or may be affixed to the end of the extension.

The extension may comprise first and second extensions. The first valve means or valve may be mounted or attached to the first extension, e.g. to an end of the first extension. The second valve means or valve may be mounted or attached to the second extension. The second extension may be concentric and/or coaxial and/or external to the first extension. The second extension may extend from the first extension, for example from an outer surface thereof. The second extension may surround (e.g. at least partially) the first extension. The first extension may comprise a first extension wall. One or more apertures may be provided in the first extension, e.g. through the first extension wall. The second extension may comprise a second extension wall. One or more apertures may be provided in the second extension, e.g. through the second extension wall.

The second conduit and/or the housing may comprise cleaning means e.g. a cleaning nozzle. Cleaning nozzles may be distributed (each at same or different angles and at distinct locations) on a wall of the second conduit and/or the housing. Nozzles preferably located above the flame arrester element at a site of use may be arranged to discharge a cleaning liquid or compressed gas. A cleaning liquid will clean the flame arrester element.

Advantageously, cleaning nozzles provide an in-situ cleaning means and make maintenance easy. Accordingly the valve apparatus will work efficiently with a less maintenance frequency.

A further aspect of the invention provides valve apparatus or a flame arrester (for example as set out above), comprising a housing having an end wall, the end wall is openable when the pressure within the housing reaches a threshold value. Advantageously, such an end wall will provide an emergency pressure relief valve.

A further aspect of the invention provides a flame arrester comprising a valve apparatus as described above. The flame arrester may comprise a flame arrester element, for example located at least partially in or adjacent the second conduit. The flame arrester may comprise a housing, for example into which the first conduit extends. The second conduit may be defined between the first conduit and the housing. The second conduit may surround the first conduit, e.g. entirely or partially surround the first conduit. The second conduit may be coaxial with the first conduit. Alternatively, the second conduit may be positioned eccentrically, e.g. non-axially aligned with the first conduit. The flame arrester element may surround (for example at least partially) the first conduit.

The valve apparatus may comprise a flame arrester element, for example located at least partially in or adjacent the second conduit. The flame arrester element may surround (e.g. at least partially) the first conduit. The flame arrester element may extend radially from the first conduit. The flame arrester element may be located substantially symmetrically around the first conduit.

The flame arrester element (where provided) may be attached or attachable, e.g. removably attached or attachable, to the valve apparatus. Attachment (e.g. removable attachment) may be affected by use of one or more fixations, for example nuts and bolts and the like. Advantageously, provision of a removable flame arrester element allows the flame arrester element to be readily and rapidly removed, for example for replacement or maintenance such as inspection and/or cleaning. Furthermore, the valve apparatus may hence be used in apparatus other than a flame arrester.

Alternatively, the flame arrester element may be securely attached with the valve apparatus for example through flange connection. That is, the valve apparatus comprises the valve means or valves (the upper part of the valve apparatus) and the flame arrester or flame arrester element (the lower part of the valve apparatus). The valve means or valves are securely attached/fixed through flanges and they are easily separated from each other.

In embodiments, the valve apparatus may comprise a fluid permeable screen, for example a net, gauze or mesh or a perforated plate. The fluid permeable screen may be arranged to prevent ingress of objects and organisms (e.g. birds or insects) into the valve apparatus. Where a flame arrester element is provided a fluid-permeable screen may not be required.

In embodiments, the first and/or second valve means or valve(s), or any component part thereof, may be removably attached to the valve apparatus or flame arrester. For example, the first and/or second valve member (where provided) may be removably attached to the valve apparatus or flame arrester. In this way, the first and/or second valve means or valve(s), or any component part thereof, may be readily and rapidly removed from the valve apparatus or flame arrester, for example in order to effect replacement or maintenance thereof. Such ease of maintenance or replacement provides the valve apparatus or flame arrester with an enhanced useable lifetime relative to valve apparatus or flame arresters absent such removably attached components.

The valve apparatus may comprise a partition or wall, e.g. configured to separate or partition a volume within the housing. The partition or wall may be configured to define a first chamber, e.g. within the housing. The first chamber may be defined between an end wall of the housing and the partition or wall. The partition or wall may extend between the first conduit (for example the second extension, where present) and the housing. The partition or wall may surround, e.g. entirely or partially, the first conduit (for example the second extension, where present). The partition or wall may extend around the periphery of the first conduit (for example the second extension). The partition or wall may provide a fluid tight seal between the first conduit (e.g. the second extension) and the housing.

The valve apparatus may comprise a bypass conduit, for example located within the housing. The bypass conduit may be in or allow fluid communication with the first conduit and/or the first chamber, for example when the valve means or valve set (e.g. first and/or second valves, where present) is in a closed or open condition or position. The bypass conduit may provide a bypass for fluid flow past the valve means or valve set, e.g. past at least part of the valve means or valve set (for example past the first and/or second valves, where present). The bypass conduit may be located on a downstream (when the apparatus and/or flame arrester is in an out-breathing mode) side of the first valve, for example and upstream of the flame arrester element (where provided). The first conduit, e.g. first conduit wall, may comprise an aperture configured to allow fluid communicating with the first chamber (for example via the bypass conduit).

The bypass conduit may comprise a pipe or tube, for example extending between the first conduit and the first chamber. The valve apparatus or flame arrester or bypass conduit may comprise a diversion barrier or wall extending between the first conduit and the housing. The bypass conduit may be configured to divert, in use, fluid flow away from the second conduit (e.g. away from a portion of the second conduit) and/or the flame arrester element (e.g. away from a portion of the flame arrester element). The diversion barrier or wall may be configured to occlude a portion, e.g. a minor portion, of the second conduit and/or flame arrester element. The diversion barrier or wall may be configured to define the bypass conduit, e.g. in concert with at least part of the first conduit and/or the housing.

The flame arrester element (where provided) may extend radially from the first conduit, e.g. concentrically or eccentrically thereabout. The flame arrester element may radiate away from the first conduit, either orthogonally (for example substantially orthogonally) to the principal axis of the first conduit or at an angle thereto. In this regard, 'orthogonally' and 'substantially orthogonally' need not have their strict mathematical meaning, e.g. the flame arrester element may be inclined at an angle of greater than or less than 90° to the principal flow axis of the first conduit. The flame arrester element may extend from the first conduit (e.g. the conduit wall) to the housing (e.g. the housing side wall).

The flame arrester element may comprise a crimped ribbon, wire mesh and/or one or more apertured or perforated plates. The flame arrester element may be located substantially symmetrically, e.g. symmetrically, about the first conduit. The flame arrester element may comprise a first major surface and, for example a second major surface. The first and/or second major surface may be substantially orthogonal to the principal flow axis (where provided) extending along the first conduit. The extension, where provided, may extend beyond both major surfaces of the flame arrester element.

The housing (where provided), the first conduit, the partition or wall (where provided), the second conduit (where provided) and/or the extension (where provided) may be formed by casting or may be formed by any other suitable technique or method, for example forging and/or machining techniques such as cutting, drilling, grinding, etc. Advantageously, component parts formed by casting may comprise smoother edges and/or more optimised shapes than do component parts formed from other techniques. Moreover, forming component parts from casting may allow the formation of relatively complex shapes which, if formed by other techniques, may otherwise require plural individual components subsequently joined together (for example via welding). Consequently, forming component parts by casting may enhance the flow of fluid through and/or against said component parts relative to non-cast component parts. Furthermore, reduction of sharp edges and joins and/or more optimised shapes may result in relatively reduced friction losses during fluid flow thereover or thereagainst. In particular, casting can produce more streamlined surfaces than can other methods of manufacture, thereby improving the flow fluids thereagainst and reducing pressure losses within the apparatus. Indeed, the flow pattern and/or flow rate of fluid into and/or through a valve apparatus or flame arrester utilizing component parts formed by casting may be enhanced relative to using component parts formed by other techniques.

The flame arrester may comprise an EOL flame arrester. Conventional EOL flame arresters usually protect the flame arrester element from environmental effects by a weather hood which hides the flame arrester element from visual inspection and routine maintenance.

Advantageously, the flame arrester of the invention provides for rapid and easy visual inspection of the flame arrester element. Thereby regular maintenance and inspection of the flame arrester element (which is vital to prevent blockage thereof and to ensure effective flow therethrough, when required) is provided by flame arresters according to the present invention.

In embodiments the flame arrester element may be at a lower position than is the valve means or valve set (e.g. relatively beneath the valve means or valve set), when the flame arrester is installed at a site of use. The flame arrester according to the invention may therefore not require a weather hood to protect the flame arrester element. Additionally, the flame arrester element may provide a barrier against ingress of inanimate objects and/or organisms (such as birds or insects) into the flame arrester and/or the valve apparatus. Furthermore, condensate and other detritus may drain from the flame arrester through the flame arrester element (or therearound), for example via the force of gravity. Advantageously, the flame arrester is therefore less likely to become occluded than are prior art flame arresters.

Consequently, a build-up of detritus on the flame arrester element (which might otherwise prevent or impede the flow of fluid therethrough) is at least partially mitigated, resulting in an increased useful lifetime or maintenance interval of the flame arrester.

Advantageously, the flame arrester element (where provided) in a flame arrester according to the present invention may be visible from ground level, thereby reducing maintenance and inspection expenses and at least partially mitigating against the provision of non-functional flame arrester elements.

In embodiments the flame arrester element may be securely fixed/attached to the valve means or valve set through flange connection and may be easily de-attached or disassembled. Alternatively and additionally, the flame arrester element in a flame arrester according to the present invention may be removed from the bottom.

A further aspect of the invention provides a method of altering the pressure of fluid in a first conduit, the method comprising either causing a valve means or valve set to open in response to the pressure of fluid in the first conduit being less than a first pressure and allowing a flow of fluid through a flame arrester element extending about or around the first conduit, the flow of fluid passing into a housing, through the open valve means or valve set and thence into the first conduit or the method comprising causing a valve means or valve set to open in response to the pressure of fluid in the first conduit being greater than the first pressure and allowing a flow of the fluid to travel from the first conduit, through the open valve means or valve set and thence through a flame arrester element extending about or around the first conduit.

The flow of fluid through the flame arrester element may have a principal flow axis. The flow of fluid into the first conduit may have a principal flow axis. The principal flow axes may be in opposite directions, e.g. substantially opposite directions.

For the avoidance of doubt, any of the features described herein apply equally to any aspect of the invention. It will be appreciated that any of the features specified in relation to one aspect may be used in relation of the or any of the other aspects of the invention.

Embodiments of the invention will now be described by way of example only with reference to the accompanying drawings in which.

Figure 1:
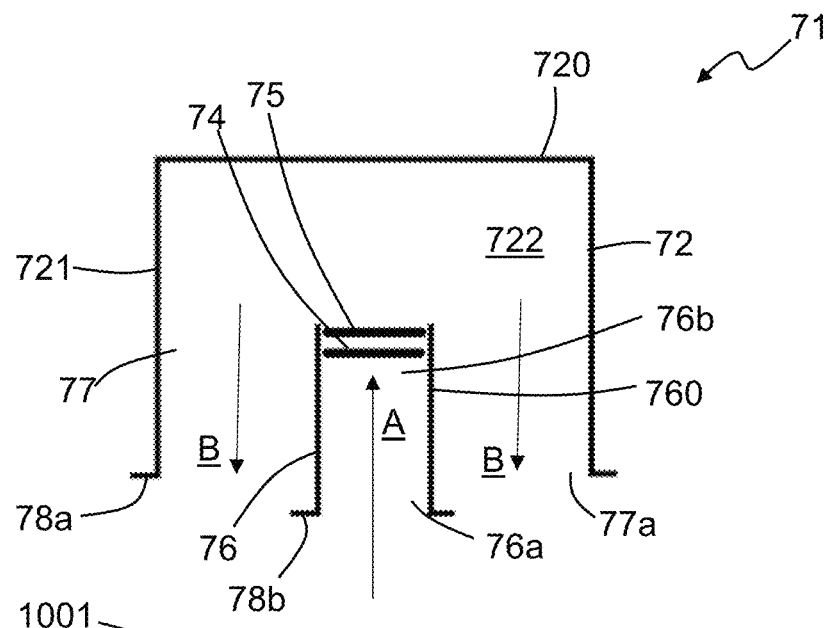
FIG. 1 is a sectional view of a generalised embodiment of a valve apparatus according to the invention.

Referring now to FIG. 1, there is shown a generalised embodiment of a valve apparatus 71 according to a first embodiment of the invention. The valve apparatus 71 includes a housing 72, a first, pressure relief valve 74, a second, vacuum relief valve 75, a first conduit 76 for fluid flow and a second conduit 77 for fluid flow (which is defined between the housing 72 and the first conduit 76 in this embodiment). In embodiments, however, the second conduit 77 may not be defined at all by the first conduit 76.

The housing 72 includes an end wall 720 and a side wall 721 extending from around the periphery of the end wall 720. The end wall 720 and side wall 721 are joined in a fluid tight manner. The housing 72 is formed from cast iron or steel or other suitable alloys, in this embodiment, and may be an integral unit or may include plural components fixed together (e.g. by suitable fixing means or fixings such as bolts, welding, etc.). Where the housing 72 includes plural components it will be understood that they are joined together, prior to use, in a fluid tight manner suitable to retain fluids at the desired operating pressures (the joins may comprise one or more seals, for example).

The first, pressure relief valve 74 and the second, vacuum relief valve 75 are located within the housing 72, e.g. such that the housing 72 is configured to cover the valves 74, 75, in use.

The first, pressure relief and second, vacuum relief valves 74, 75 are configured to allow a flow of fluid, in use, from the first conduit 76 into the second conduit 77 (e.g. which is defined within the housing 72) when the pressure in the first conduit 76 is greater than a first pressure. The first, pressure relief and second, vacuum relief valves 74, 75 are also configured to allow a flow of fluid, in use, from the second conduit 77 (e.g. which is defined within the housing 72) into the first conduit 76 when the pressure in the first conduit 76 is less than a second pressure. The second pressure is less than the first pressure.

The first conduit 76 has a substantially constant cross-section along at least a portion of its length, in this embodiment, however in other embodiments the cross-section may vary along at least a portion of the length of the first conduit 76. The cross-section may have any suitable shape, for example a circle, oval, ellipse, rectangle, etc. The first conduit 76 is formed from cast iron, steel or aluminium in this embodiment, however one skilled in the art will appreciate that other materials and methods of manufacture may also be suitable.

The first conduit 76 includes a first end 76a and a second end 76b. The first end 76a provides an inlet to the valve apparatus 71 in an out-breathing operation, and in the alterative, in an in-breathing operation, the first end 76a provides an outlet from the valve apparatus 71. The first conduit 76 includes an extension 760 which extends from and is provided at the second end 76b of the first conduit 76. The first, pressure relief valve 74 and second, vacuum relief valve 75 are operably connected or secured to the extension 760. The first, pressure relief valve 74 and second, vacuum relief valve 75 are distinct from one another.

The first conduit 76 has a principal flow axis A extending therealong for the flow of fluid, in use, into or out of the valve apparatus 71. The second conduit 77 has a principal flow axis B, for the flow of fluid, in use, out of or in to the valve apparatus 71. The principal flow axes A, B are parallel and extend in opposite directions. The second conduit 77 has an open end 77a for the flow of fluid therethrough.

In use, the valve apparatus 71 is installed or attached to a site of use, for example a tank (not shown) or pipe (not shown) containing or for containing a fluid (e.g. a combustible or non-combustible fluid). The first end 76a of the first conduit 76 is attached via attachment flanges 78b to a connection (not shown) of the tank or pipe in order to afford fluid communication therebetween. The housing 72 may be connected to a flame arrester element (not shown) and/or a bird screen (not shown) via attachment flanges 78a. Attachment may be affected by bolts or any other suitable means of attachment.

If a pressure of fluid within the first conduit 76 is greater than the first pressure then the first, pressure relief valve 74 is caused to open and allow a flow of said fluid from the first conduit 76 to the second conduit 77. The flow of fluid travels from the first conduit 76 into the second conduit 77 and thence out of the housing 72. In this way an excess pressure within a tank or pipe to which the valve apparatus 71 is attached may be relieved, e.g. the pressure of fluid within the tank or pipe may be reduced such that it is less than the first pressure.

If a pressure of fluid within the first conduit 76 is less than the second pressure then the second, vacuum relief valve 75 is caused to open and allow a flow of fluid into the first conduit 76. The flow of fluid flows from external to the housing 72 (e.g. from the environment thereabout), through the second conduit 77, through the open second, vacuum relief valve 75 and thence into the first conduit 76. The flow through the second conduit 77 defines an annular flow of fluid around the first conduit 76. In this way an excess vacuum within the tank or pipe to which the valve apparatus 71 is attached may be relieved, e.g. the pressure of fluid within the tank or pipe may be increased such that it is greater than the second pressure.

The pressure of fluid within a tank or pipe to which the valve apparatus 71 is attached may therefore be maintained at a level within operating safety limits of those structures.

At its open end 77a the second conduit 77 has a total cross-sectional area of flow (e.g. an annular cross-sectional area) which is preferably, but not limited to, between about 1.5 and about 3 times the cross-sectional area of the first conduit 76 at its first end 76a. In embodiments the total cross-sectional area of flow of the open end 77*a* of the second conduit 77 may be 6 times or more the cross-sectional area of the first conduit 76 at its first end 76*a*, for example up to 16 times the cross-sectional area of the first conduit 76 at its first end 76*a*.

Figure 2:
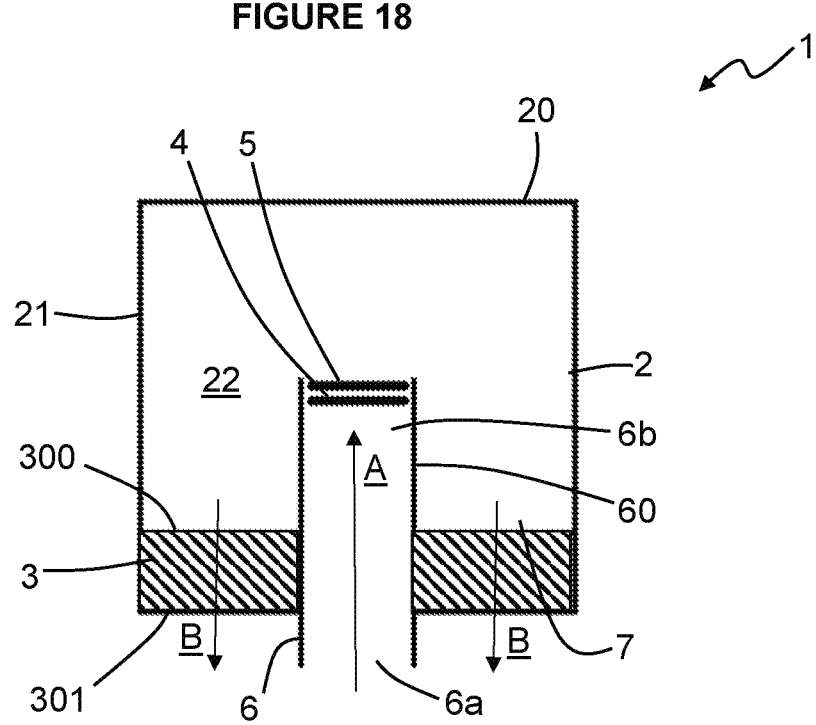
FIG. 2 is a sectional view of a generalised embodiment of a valve apparatus integrated with a flame arrester according to a further embodiment of the invention.

Referring now to FIG. 2, there is shown a generalised embodiment of a valve apparatus integrated with a flame arrester 1 (hereinafter referred to as a valve apparatus 1) according to a further embodiment of the invention. The valve apparatus 1 includes a housing 2, a flame arrester element 3, a pressure relief valve 4, a vacuum relief valve 5, a first conduit 6 for fluid flow and a second conduit 7 for fluid flow (which is defined between the housing 2 and the first conduit 6 in this embodiment). The first conduit 6 extends into the housing 2 and the flame arrester element 3 completely surrounds the first conduit 6. In embodiments the flame arrester element 3 may only partially surround the first conduit 6. Where the valve apparatus 1 is described as being integrated with a flame arrester it will be appreciated that the flame arrester (for example the flame arrester element 3) may be removably or non-removably attached to the valve apparatus 1.

The flame arrester element 3, in this embodiment, comprises a crimped ribbon, however in other embodiments it may additionally or alternatively include wire mesh and/or one or more apertured or perforated plates. The flame arrester element 3 has a first major surface 300 and a second major surface 301.

The flame arrester element 3 extends from the first conduit 6 to the housing 2. The flame arrester element 3 extends radially from the first conduit 6, and concentrically therebetween. The flame arrester element 3 is located substantially symmetrically, e.g. symmetrically, around the first conduit 6.

The flame arrester element 3 radiates away from the first conduit 6 orthogonally (for example substantially orthogonally) to the principal axis A of the first conduit 6. However, in embodiments the flame arrester element 3 may radiate away from the first conduit 6 at an angle to the principal axis A, for example at an angle less than 90°. In this embodiment the first and second major surfaces 300, 301 of the flame arrester element 3 are substantially orthogonal to the principal flow axis A extending along the first conduit 6.

The housing 2 includes an interior chamber 22 between the end wall 20 and the flame arrester element 3. In embodiments, the housing 2 may comprise an upper and a lower portion, for example which may be removably attached to one another by attachments (not shown). The valve apparatus 1 may comprise the upper portion of the housing 2 whilst the flame arrester element 3 may be located or locatable within the lower portion of the housing 2. Additionally or alternatively, the first conduit 6 may comprise an upper portion (for example including the second end 6*b*) and a lower portion (for example including the first end 6*a*), where the upper and lower portions may be removably attached to one another by attachments (not shown). The valve apparatus 1 may comprise the upper portion of the first conduit 6 whilst the flame arrester element 3 may be located or locatable around the lower portion of the first conduit 6. Alternatively, the flame arrester element 3 may be removably attached to the housing 2 which may comprise a single portion and/or to the first conduit 6 which may comprise a unitary body.

In use, the valve apparatus 1 functions in an analogous manner to the valve apparatus 71 shown in FIG. 1. Additionally, the flame arrester element 3 provides protection against the transmission of atmospheric deflagration in the vicinity of the flame arrester to a tank or pipe to which it is connected. The second conduit 7 passes through the flame arrester element 3. Consequently, in use, fluid flow through the second conduit 7 travels through the flame arrester element 3, either in an in-breathing mode (when the valve apparatus 1 allows fluid flow from the second conduit 7 to the first conduit 6) or out-breathing mode (when the valve apparatus 1 allows fluid flow from the first conduit 6 to the second conduit 7). Accordingly, the flame arrester element 3 mitigates against the transmission of deflagrations from outside the valve apparatus 1 to the tank or pipe to which it is attached (not shown).

Referring now to FIGS. 3 to 6, there is shown a valve apparatus integrated with a flame arrester 11 (hereinafter referred to as a valve apparatus 11) according to a further embodiment of the invention, wherein like features to those described in respect of the valve apparatus 1 shown in FIG. 2 are denoted by like references preceded by a '1' or succeeded by a prima 0, which will not be described further herein.

The flame arrester element 13 is removably attached to the housing 12 and/or the first conduit 16 by fixings 18*a* which are bolts and nuts in this embodiment. The flame arrester element 13 is a crimped ribbon element in this embodiment and includes a top element ring 13*a*. In embodiments, however, the top element ring 13*a* may not be provided and/or the flame arrester element 13 may be of any other suitable type, for example comprising apertured or perforated plates.

The extension 160 and the conduit 16 are formed from separate parts in this embodiment and are attached together with a gasket G or O-ring therebetween. Advantageously, the extension 160 and the conduit 16 may therefore be readily attached together and/or separated, for example in order to facilitate inspection and/or removal of the flame arrester element 13 when necessary. In embodiments the flame arrester element 13 may be attached (e.g. removably) to the valve apparatus 11 by an alternative arrangement, for example via flanges.

The extension 160 of the first conduit 16 includes a first extension 161 with a second extension 162 extending therefrom. The second extension 162 has a greater internal diameter than does the first extension 161. The second extension 162 extends from an outer surface of the first extension 161 and around the entire periphery thereof providing a fluid tight seal therearound. The second extension 162 may be formed integrally with the first extension 161 or may be attached thereto, for example welded thereto. The first extension 161 includes a first extension wall with a passageway 161*a* therethrough. The second extension 162 includes a second extension wall with a passageway 162*a* therethrough. In this embodiment component parts such as 12, 160, 161, 162, 190 are separate components which are attached together. In embodiments, however, some or all of the components 12, 160, 161, 162, 190 may be formed as a unitary structure, for example by casting. For example, the first conduit 16 and the extension 160 may comprise a unitary or permanently joined structure.

The valve apparatus 11 includes a partition or wall VB and a bypass conduit 108.

The partition or wall VB extends between the second extension 162 of the first conduit 16 and the housing 12. The partition or wall VB extends around the periphery of the extension 162 and provides a fluid tight seal between the housing 12 and the second extension 162. A first chamber C1 is defined between the end wall 120 of the housing 12 and the partition or wall VB.

The bypass conduit 108 is located within the housing 12 and is configured to allow, in use, fluid communication between the first conduit 16 and the first chamber C1 when either or both of the first, pressure relief valve 14 and the second, vacuum relief valve 15 are in a closed or open position or condition. In this way the bypass conduit 108 is configured to provide a bypass route for fluid flow past the valve apparatus 11 to and from the first chamber C1.

The bypass conduit 108 includes a diversion barrier or wall 190 which extends from the extension 160 to the housing 12. The bypass conduit 108 is thus defined by a portion of the housing 12, a portion of the extension 160, a portion of the second extension 162, the partition or wall VB, the diversion barrier or wall 190 and two diversion walls 190a which extend between extension 160, the second extension 162 and the housing 12. The diversion barrier or wall 190 forms a fluid tight seal with the first extension 161 and the side wall 121 of the housing 12. The diversion walls 190a extend from the first and second extensions 161, 162 to the side wall 121 of the housing 12 and provide a fluid tight seal against the first and second extensions 161, 162, the side wall 121 of the housing 12, the diversion barrier or wall 190 and the partition or wall VB. The partition or wall VB includes a passageway VB1 therethrough, positioned to allow fluid communication between the first chamber C1 and the bypass conduit 108.

The first, pressure relief valve 14 is mounted to the first extension 161 and the second, vacuum relief valve 15 is mounted to the second extension 162. The first, pressure relief valve 14 includes a first valve pallet 14a and a first valve seat 14b. The first valve seat 14b is disposed at the end of the first extension 161. The second, vacuum relief valve 15 includes a second valve pallet 15a and a second valve seat 15b. The second valve seat 15b is located at the end of the second extension 162. The first and second valves 14, 15 are parallel and spaced from one another and are concentrically aligned about central axes through each valve 14, 15.

Figure 3:
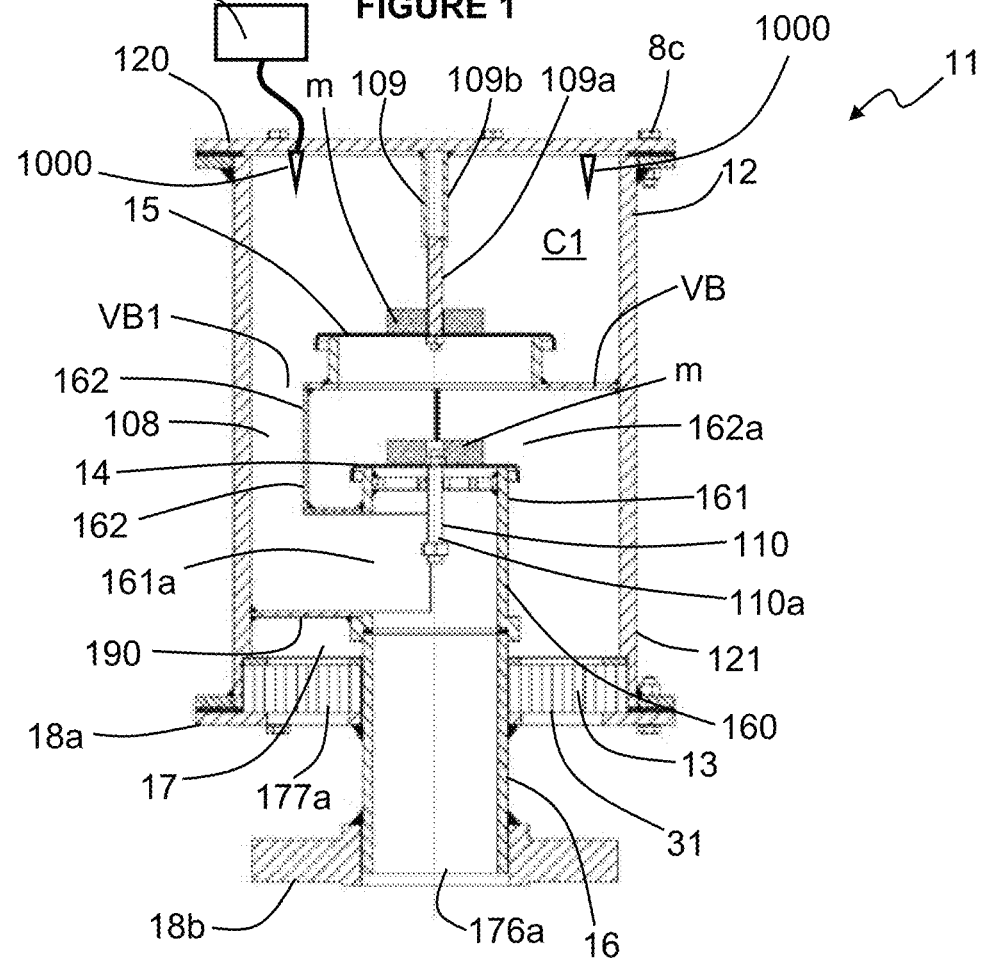
FIG. 3 is a sectional view of a valve apparatus integrated with a flame arrester according to a further embodiment of the invention.
Figure 18:
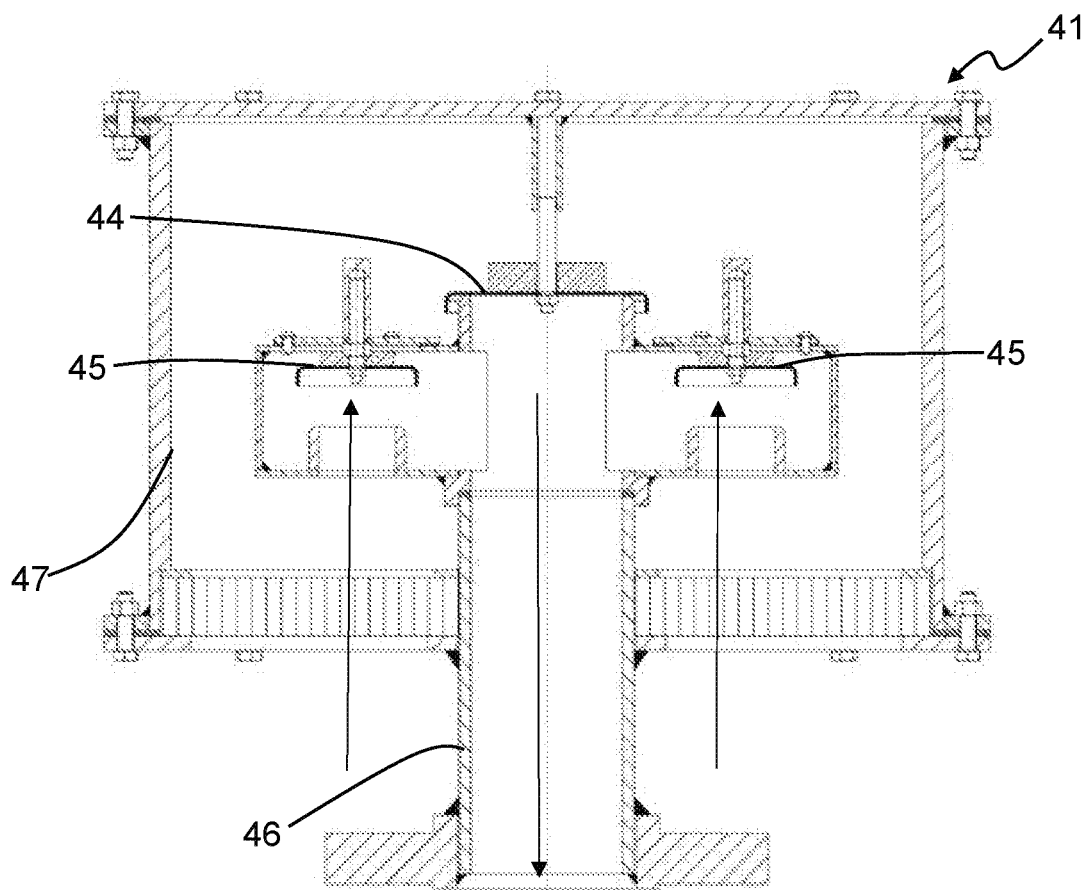
FIG. 18 is a sectional view of the valve apparatus shown in FIG. 15 with the vacuum relief valve in an open condition.
Figure 4:
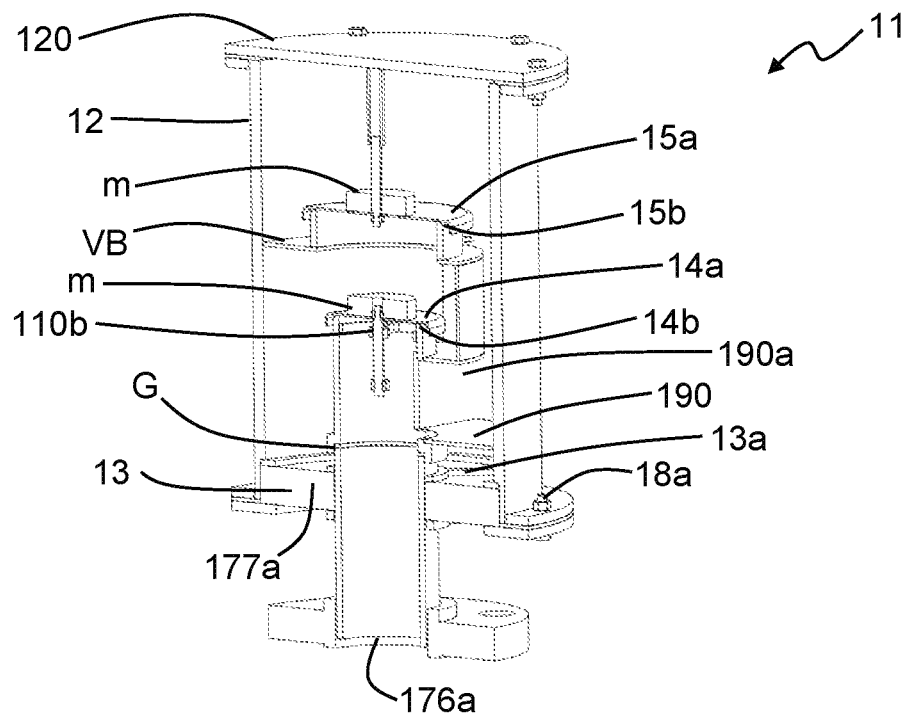
FIG. 4 is a cut-away view of the valve apparatus shown in FIG. 3.

In the valve apparatus 11 shown in FIGS. 3 and 4 the first, pressure relief valve 14 and the second, vacuum relief valve 15 are both biased toward a closed condition or position by a mass m attached to each of the first and second valve pallets 14a, 15a (and are absent compression springs or other forms of resilient biasing means or resilient biasing members).

The valve apparatus 11 also includes first and second guides 109, 110 (which are stem guides in this embodiment) configured to guide, respectively, in use, the first, pressure relief valve 14 and the second, vacuum relief valve 15. The first guide 109 includes a first stem 109a, having a first end attached to the second valve pallet 15a and a second, free end, received within a first cylinder 109b. The first cylinder 109b is attached to the end wall 120 of the housing 12. The second guide 110 includes a second stem 110a, having a first end attached to the first valve pallet 14a and a second, free end, received within a second cylinder 110b. The second cylinder 110b is attached to the extension 160 by arms.

It will be appreciated by one skilled in the art that different structures of first and second guides may be used, for example, those as shown in the second, vacuum relief valve (FIG. 3).

The end wall 120 of the housing 12 is removably attached thereto by fixings 8c, which are bolts and nuts in this embodiment, although in embodiments the fixings 8c may be of any suitable type. Advantageously, by removing the end wall 120 the second vacuum relief valve 15 may be inspected and/or removed for repair or replacement readily and rapidly. If the second, vacuum relief valve 15 is removed the first, pressure relief valve 14 may be inspected and/or removed for repair or replacement.

The end wall 120 of the housing 12 is shown as having a generally flat outer surface in this embodiment, however, in embodiments this need not be the case and instead the end wall 120 may have any suitable shape. For example, the end wall may have a convex or concave (dished) shape). The first guide 109 may at least partially extend beyond part or the majority of the outer surface of the end wall 120. Advantageously, the overall volume of the valve apparatus 11 may be relatively reduced by this arrangement, with a consequential saving in material use and hence weight and expense. In embodiments the end wall 120 may comprise a lifting eye or lug or a ring nut or other attachment.

Figure 5:
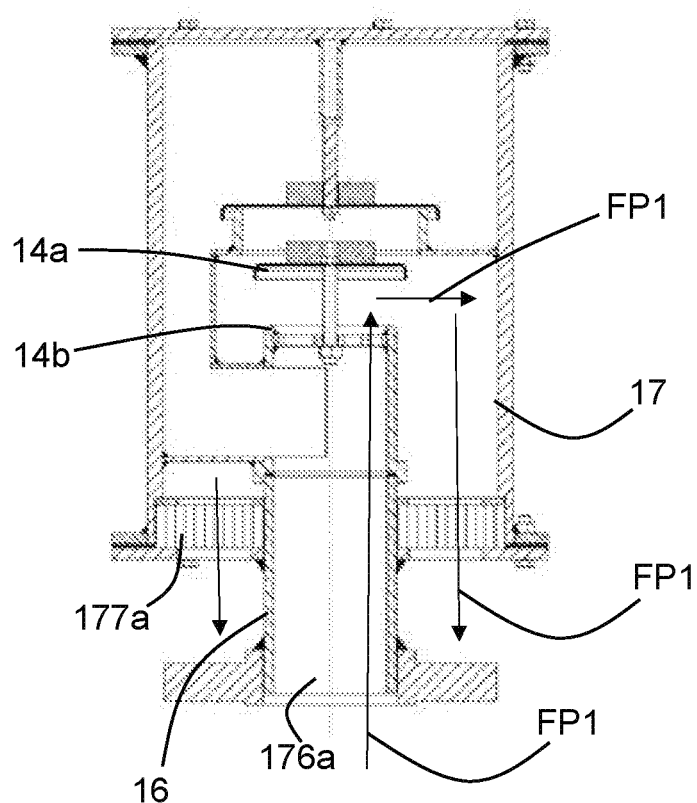
FIG. 5 is a sectional view of the valve apparatus of FIG. 3 with the pressure relief valve in an open condition.

In use, if the pressure of fluid within the first conduit 16 exceeds the first pressure, the first, pressure relief valve 14 is caused to move into an open position or condition, whereby the first valve pallet 14a is caused to move away from the first valve seat 14b against the bias of the mass (as shown in FIG. 5). Fluid is then allowed to flow along a first fluid flow path FP1 from the first conduit 16 into the second extension 162 and thence through the passageway 162a therein and out of the second conduit 17 and hence out of the housing 12. It will be appreciated by one skilled in the art that flow through the second conduit 17 will surround the first conduit 16, whilst the arrows are provided merely to indicate the direction of flow. When the pressure of fluid within the first conduit 16 is reduced to a pressure less than the first pressure, the first, pressure relief valve 14 returns to the closed position or condition due to the biasing action of the mass m.

Figure 6:
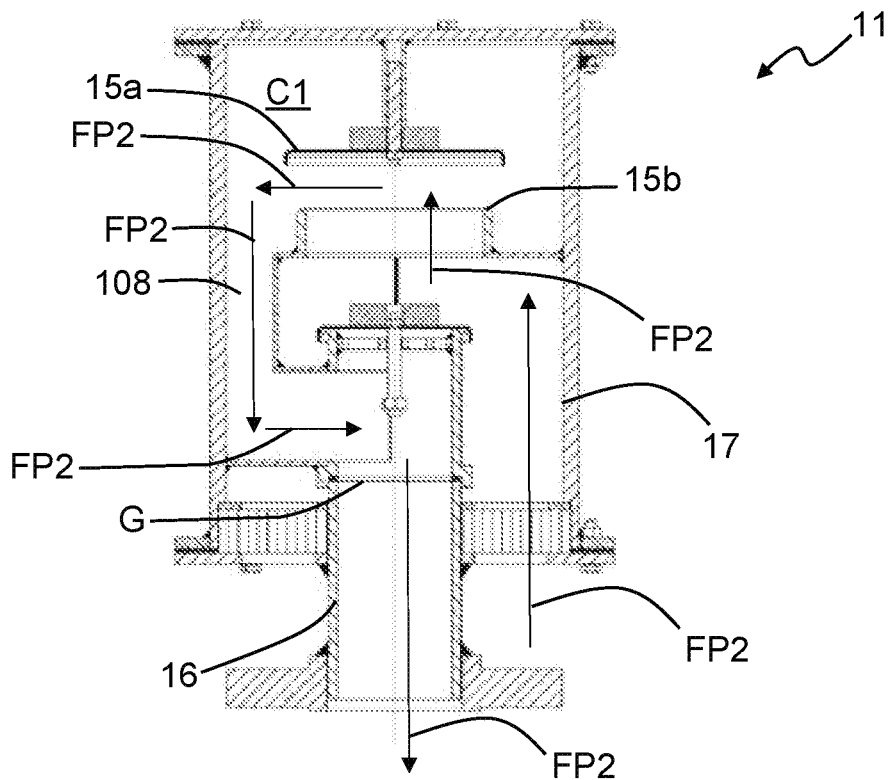
FIG. 6 is a sectional view of the valve apparatus of FIG. 3 with the vacuum relief valve in an open condition.
Figure 7:
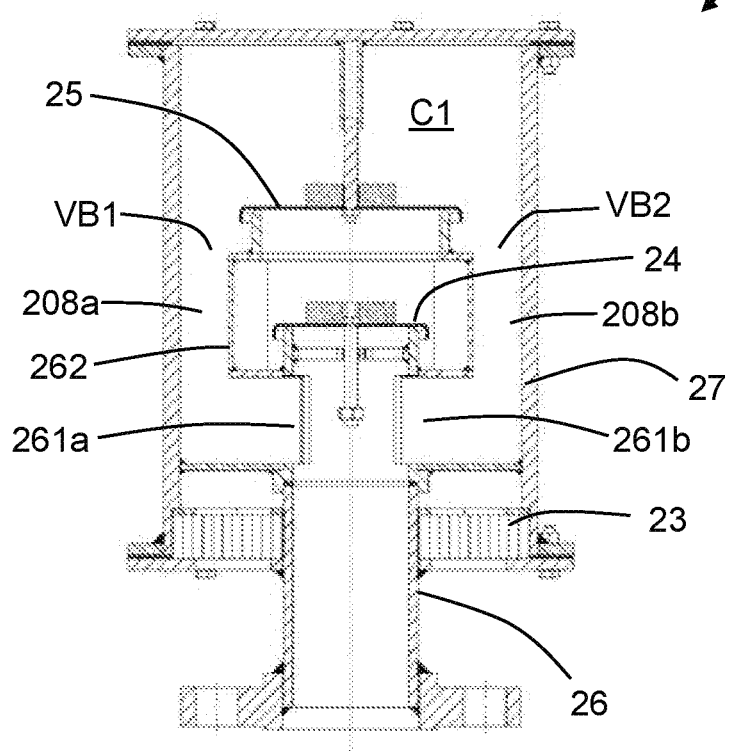
FIG. 7 is a sectional view of a valve apparatus integrated with a flame arrester according to a further embodiment of the invention.
Figure 8:
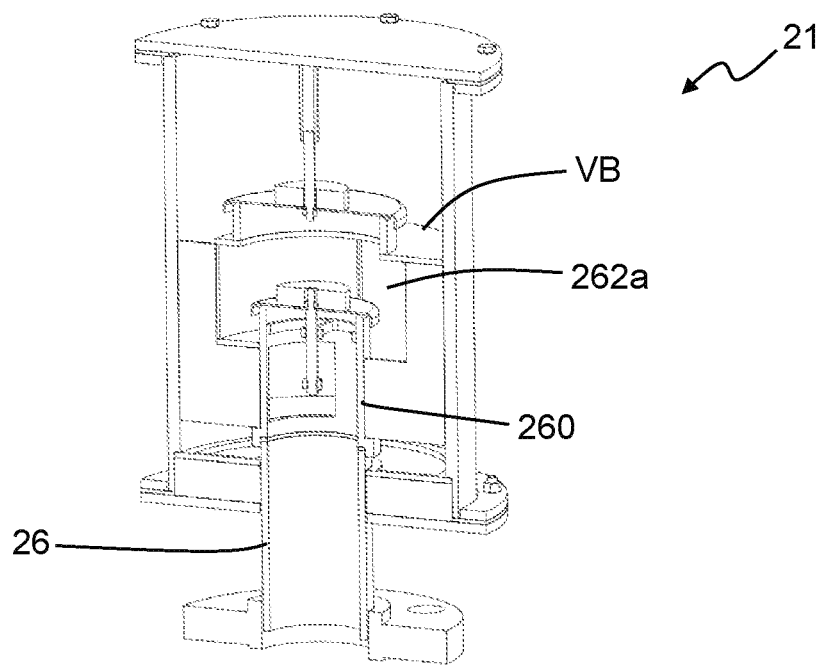
FIG. 8 is a cut-away view of the valve apparatus shown in FIG. 7.

If the pressure of fluid within the first conduit 16 is less than the second pressure (e.g. an excess vacuum is present), the second, vacuum relief valve 15 is caused to move into an open position or condition (as shown in FIG. 6). Reduced pressure (e.g. excess vacuum) of fluid within the first conduit 16 is transmitted to the first chamber C1 via the bypass conduit 108 (e.g. fluid within the first chamber C1 flows from the first chamber C1 to the first conduit 16 via the bypass conduit 108). The relatively reduced pressure within the first chamber C1 is configured to overcome the bias of the mass m attached to the second valve pallet 15a when the pressure in the first conduit 16 is less than the second pressure causing the second valve pallet 15a to unseat from the second valve seat 15b and hence move into an open position or condition. Fluid is then allowed to flow along a second fluid flow path FP2 (as indicated by the arrows in FIG. 6) from external to the housing 12, through the second conduit 17, through passageway 162a in the second extension 162, into the first chamber C1 through the open second, vacuum relief valve 15 and thence to the first conduit 16 via the bypass conduit 108. It will be appreciated by one skilled in the art that flow through the second conduit 17 will surround the first conduit 16, whilst the arrows are provided merely to indicate the direction of flow. When the pressure of fluid within the first conduit 16 has increased to a pressure greater than the second pressure, the second, vacuum relief valve returns to the closed position or condition, biased by the mass m attached to the second valve pallet 15a.

Advantageously, the end wall 120 of the housing 12 has a larger diameter than do the pallets 14a, 15a of the pressure and vacuum relief valves 14, 15, enabling ready access to said valves 14, 15. Furthermore, the pallet 14a which is located furthest from the housing 12 end wall 120 (which is the pressure pallet 14a in this embodiment) has a smaller diameter than does the valve 15 which is relatively nearer to the housing 12 end wall 120. In this way, the valve furthest from the end wall 120 of the housing 12 may be more readily and rapidly inspected and/or removed for repair or replacement.

In embodiments, the end wall 120 or portion, for example an openable end wall or portion (not shown) will automatically open as a pressure in the first conduit 16 reaches a pre-determined value or dangerous level for example due to valve malfunctions or due to the blockage of flame arrester element or in an emergency case. Advantageously, the valve apparatus may operate as an emergency vent or emergency pressure relief device/valve to protect equipment, storage tanks or containers from overpressure damage.

The second conduit 17 and/or the housing 12 may comprise in-situ cleaning means e.g. a cleaning nozzle 1000. Cleaning nozzles 1000 may be distributed (each at same or different angles and at distinct locations) on a wall of the second conduit 17 and/or the housing 12. Nozzles 1000 preferably located above the flame arrester element 13 at a site of use may be arranged to discharge a cleaning liquid or compressed gas supplied from a source of liquid or compressed gas 1001. A cleaning liquid will clean the flame arrester element.

Advantageously, in-situ cleaning means/nozzles 1000 enhance useful and useable lifetime or maintenance interval of the flame arrester. Accordingly the valve apparatus will reliably function under operating conditions and work efficiently with a less maintenance frequency.

In embodiments, the flame arrester element 13 may extend only partially around the first conduit 16. In embodiments the flame arrester element 13 may extend around the first conduit in a plane perpendicular to the principal flow axis of the first conduit 16, for example in a plane in which the bypass conduit 108 (e.g. a lower portion thereof, where lower is relative to the orientation shown in FIG. 3) is located. In embodiments, the flame arrester element 13 and the diversion barrier or wall 190 may extend around the first conduit in a plane perpendicular to the principal flow axis of the first conduit 16. In the plane perpendicular to the principal flow axis of the first conduit 16 the area (i.e. the annulus as shown) between the first conduit 16 and the housing 12 may be provided (for example over all of its area) with the bypass conduit 108 and the flame arrester element 13. In embodiments, the flame arrester element 13 may extend around the first conduit between diversion walls 190a, for example around the portion of the circumference of the first conduit not configured to provide the bypass conduit 108. In embodiments, the flame arrester element may comprise a perforated plate.

Referring now to FIGS. 7 to 10, there is shown a valve apparatus integrated with a flame arrester 21 (hereinafter referred to as a valve apparatus 21) according to a further embodiment of the invention, wherein like features to those described in respect of the valve apparatus 1 shown in FIG. 2 are denoted by like references preceded by a '2', which will not be described further herein. The valve apparatus 21 differs from the valve apparatus 11 shown in FIGS. 3 to 6 in that there are two separate pathways in either an in-breathing or an out-breathing mode for the flow of fluid between the first and second conduits 26, 27. The valve apparatus 21 includes first 262a and second (not shown) passageways through the second extension wall 262 and first and second bypass conduits 208a, 208b defined between first and second passageways VB1, VB2 through the partition or wall VB and, respectively, first and second passageways 261a, 261b through the first extension wall 261.

Figure 9:
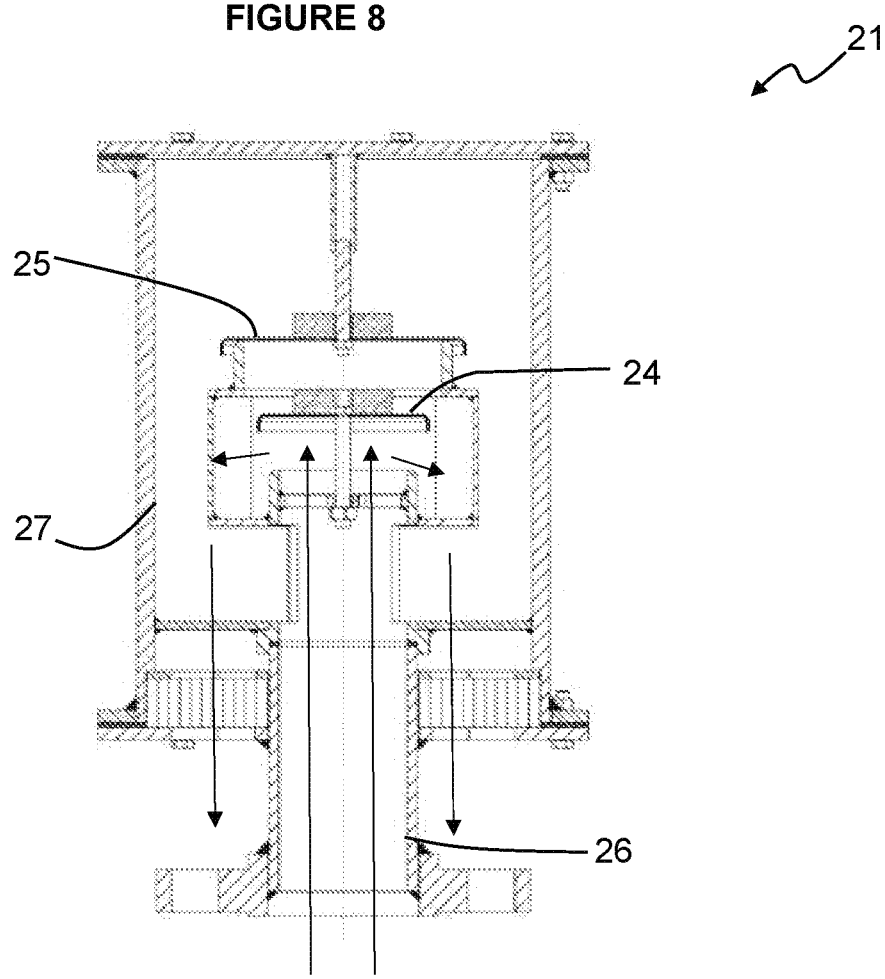
FIG. 9 is a sectional view of the valve apparatus shown in FIG. 7 with the pressure relief valve in an open condition.
Figure 10:
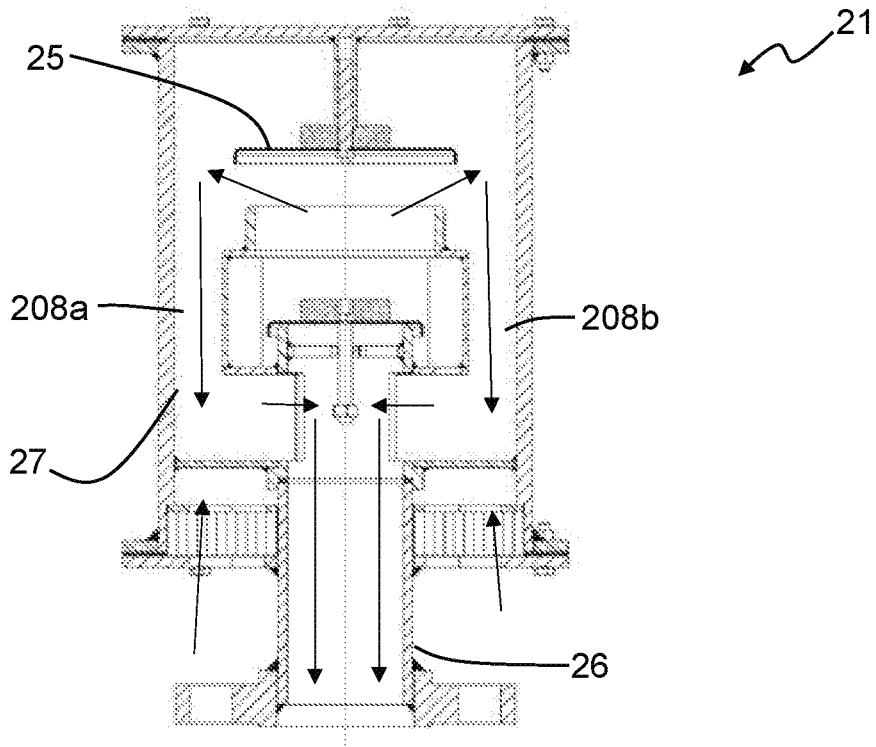
FIG. 10 is a sectional view of the valve apparatus shown in FIG. 7 with the vacuum relief valve in an open condition.
Figure 11:
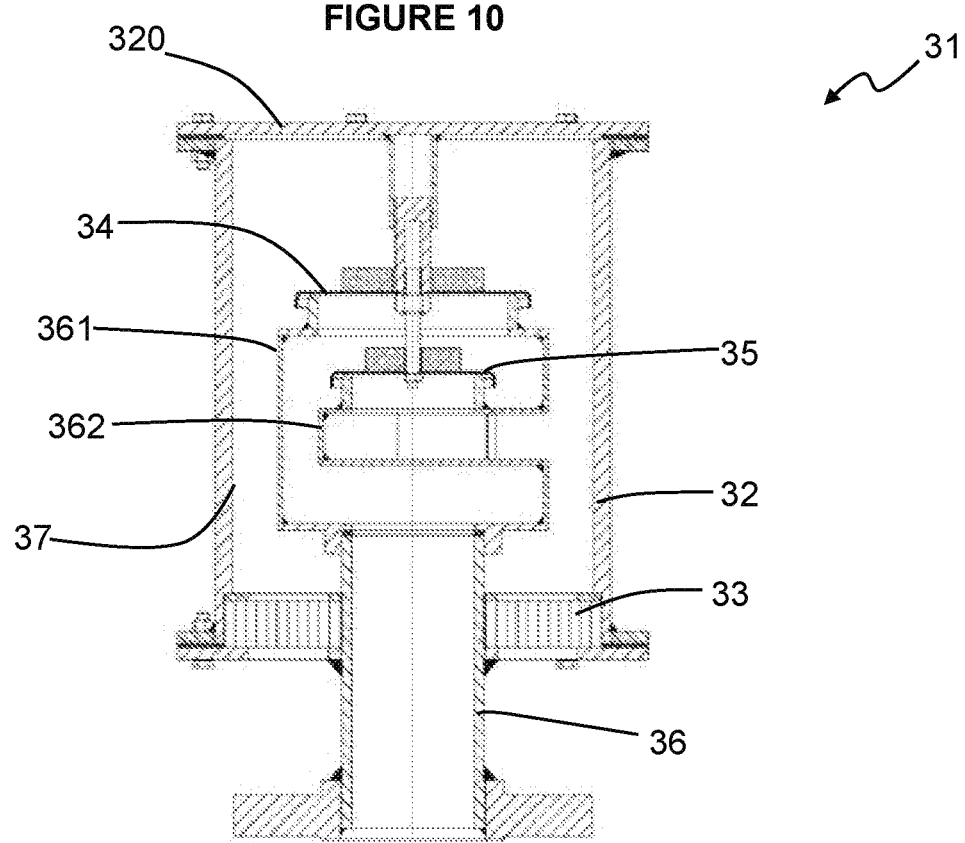
FIG. 11 is a sectional view of a valve apparatus integrated with a flame arrester according to a further embodiment of the invention.
Figure 12:
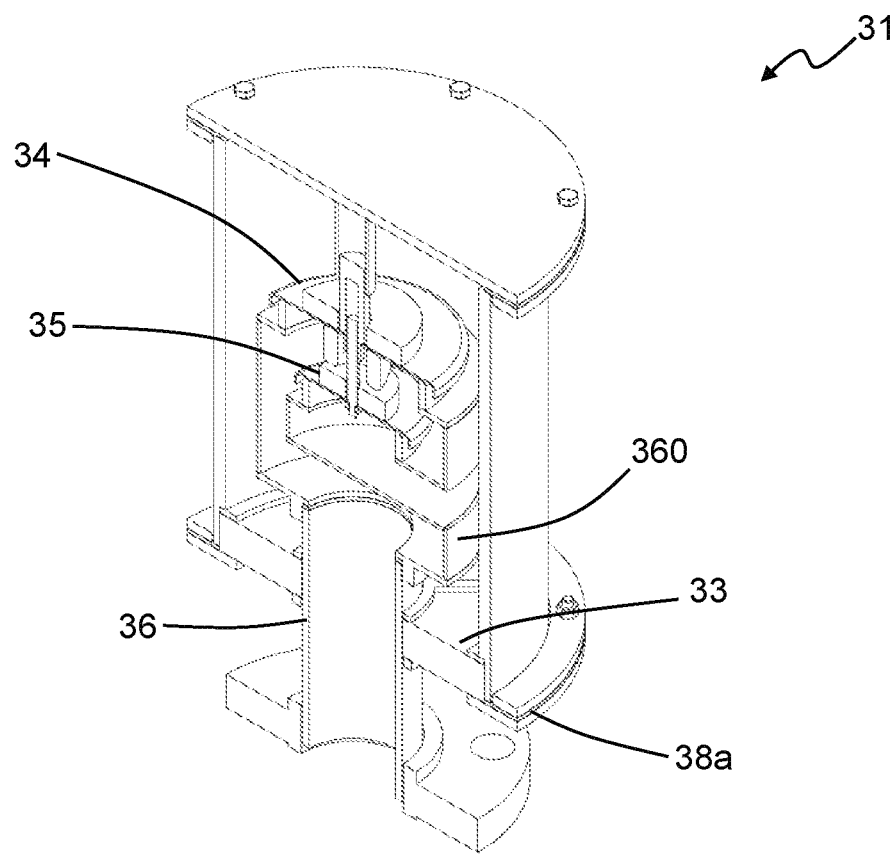
FIG. 12 is a perspective view of the valve apparatus shown in FIG. 11 with a flame arrester element attached thereto.
Figure 13:
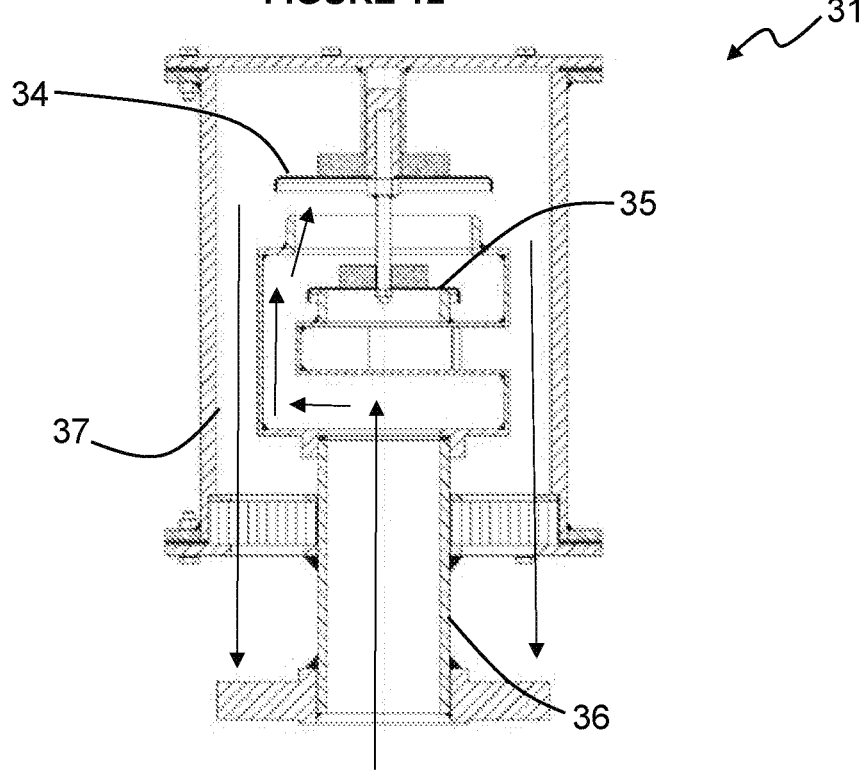
FIG. 13 is a sectional view of the valve apparatus shown in FIG. 11 with the pressure relief valve in an open condition.
Figure 14:
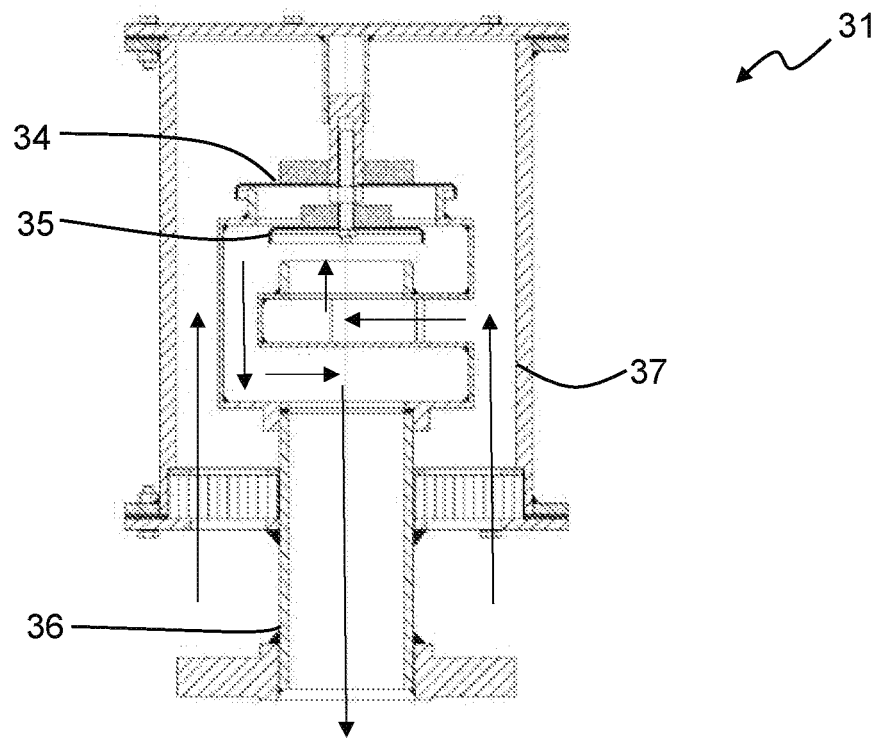
FIG. 14 is a sectional view of the valve apparatus shown in FIG. 11 with the vacuum relief valve in an open condition.
Figure 15:
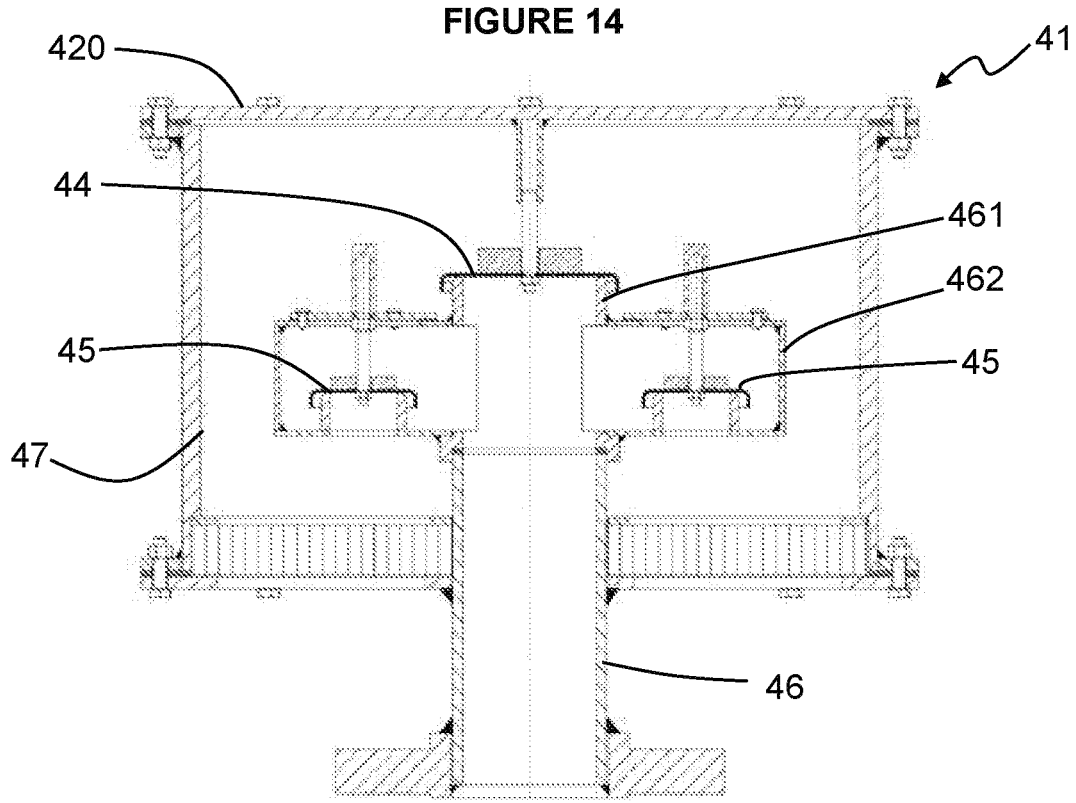
FIG. 15 is a sectional view of a valve apparatus integrated with a flame arrester according to a further embodiment of the invention.
Figure 16:
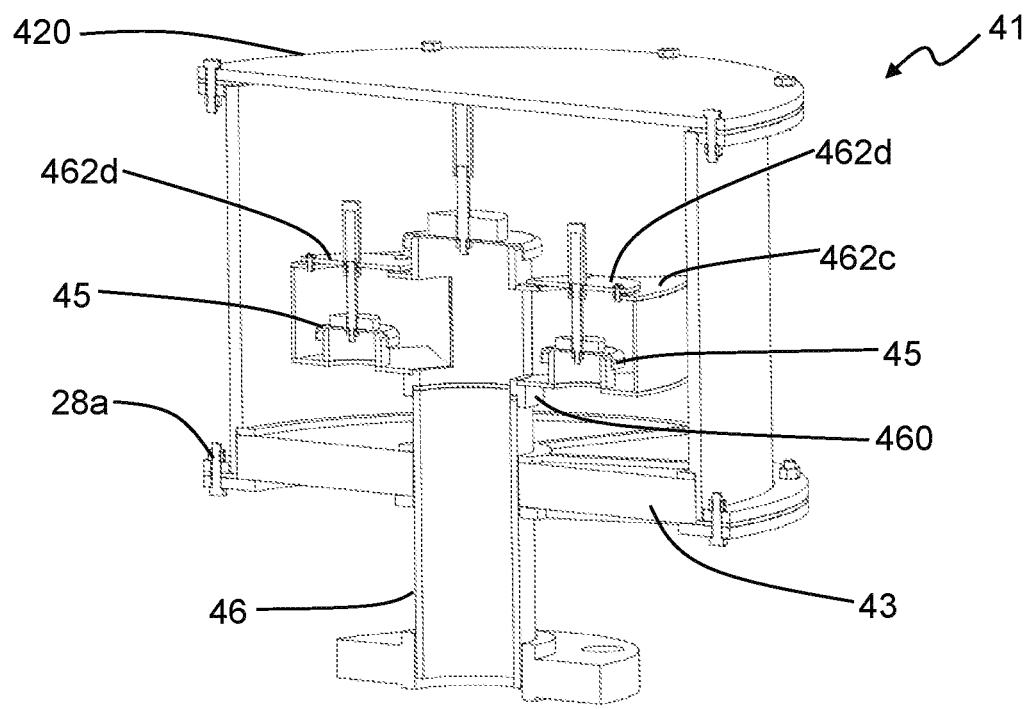
FIG. 16 is a perspective view of the valve apparatus shown in FIG. 15 with a flame arrester element attached thereto.
Figure 17:
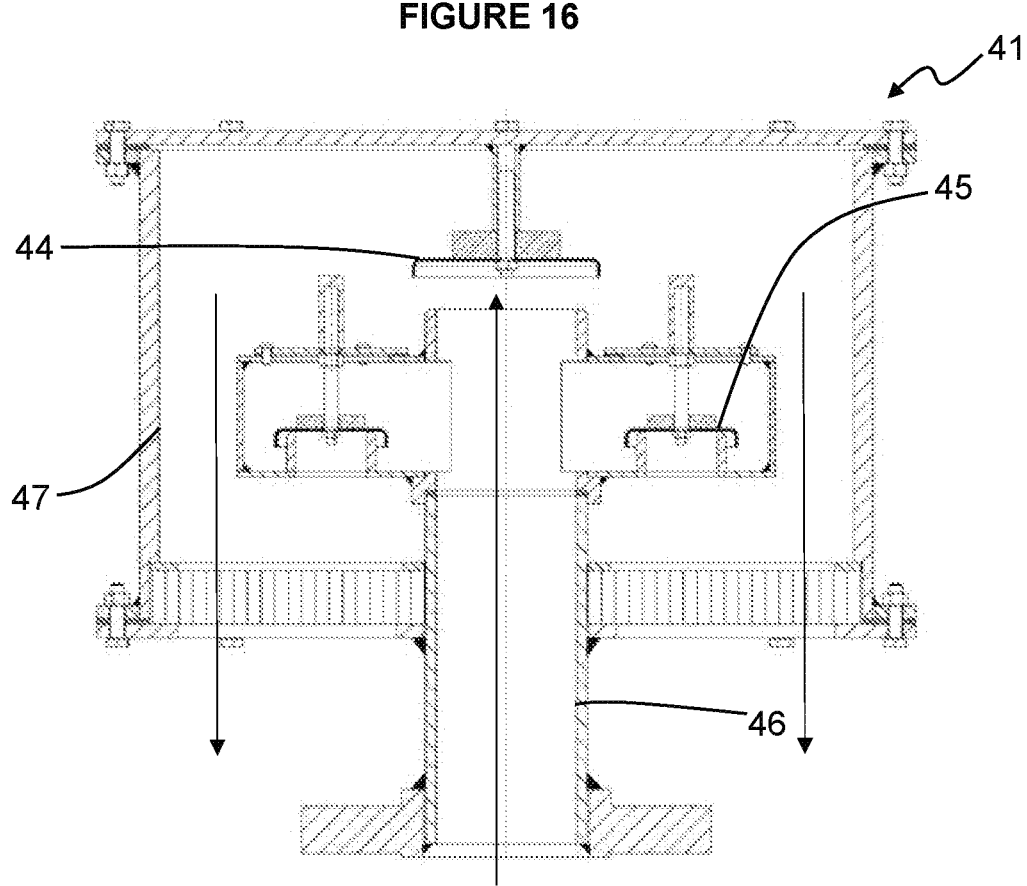
FIG. 17 is a sectional view of the valve apparatus shown in FIG. 15 with the pressure relief valve in an open condition.

In an out-breathing mode, when the first, pressure relief valve 24 is caused to move into an open condition (as shown in FIG. 9), fluid flows from first conduit 26 through the open pressure relief valve 24, through the first and second passageways 262a and thence to the second conduit 27. In an in-breathing mode, when the second, vacuum relief valve 25 is caused to move into an open condition (as shown in FIG. 10), fluid flows from the second conduit 27 to the vacuum relief valve 25 through the first and second passageways 262a (see FIG. 8), through the vacuum relief valve 25 and to the first conduit 26 by way of first and second bypass conduits 208a, 208b and the first and second passageways 261a, 261b. In this embodiment the flow of fluids within the valve apparatus 21 is well distributed and thus the flow capacity is relatively improved with respect to prior art apparatus.

Referring now to FIGS. 11 to 14, there is shown a valve apparatus integrated with a flame arrester 31 (hereinafter referred to as a valve apparatus 31) according to a further embodiment of the invention, wherein like features to those described in respect of the valve apparatus 1 shown in FIG. 2 are denoted by like references preceded by a '3', which will not be described further herein. The valve apparatus 31 differs from the valve apparatus 11 shown in FIGS. 3 to 6 in that the pressure relief valve 34 is positioned nearer to the end wall 320 of the housing 32 than is the vacuum relief valve 35. To accommodate this arrangement the second extension 362 extends within the first extension 361. The valve apparatus 31 functions in a comparable manner to the valve apparatus 11 shown in FIGS. 3 to 6. It will be appreciated by one skilled in the art that flow through the second conduit 37 will surround the first conduit 36, whilst the arrows are provided merely to indicate the direction of flow.

Referring now to FIGS. 15 to 18, there is shown a valve apparatus integrated with a flame arrester 41 (hereinafter referred to as a valve apparatus 41) according to a further embodiment of the invention, wherein like features to those described in respect of the valve apparatus 1 shown in FIG. 2 are denoted by like references preceded by a '4', which will not be described further herein. The valve apparatus 41 differs from the valve apparatus 31 shown in FIGS. 11 to 14 in that there are plural vacuum relief valves 45. The second extension 462 comprises two separate chambers which extend outwardly with respect to the first extension 461 and the first conduit 46. A vacuum relief valve 45 is provided in each of the separate chambers of the second extension 462. Furthermore, parts 462d of the end wall 462c of the second extension 462 (beneath which the vacuum relief valves 45 are located) are removably attached to the remainder of the end wall 462c (e.g. by bolts or other fixings). Advantageously, this embodiment is relatively simple in comparison to the other embodiments and may accordingly be more readily and rapidly installed and/or removed from a site of use. Where the housing 42 is provided by a pre-existing structure the valves 44, 45 may be removed or installed within the housing 42 more readily and rapidly.

In use, the valve apparatus 41 functions in an analogous manner to the valve apparatus 11 shown in FIGS. 3 to 6. Advantageously, if one of the vacuum relief valves 45 becomes stuck or its functioning is otherwise impaired the remaining vacuum relief valves 45 may continue to function and hence continue to provide vacuum relief, when needed. Accordingly, the plural vacuum relief valves 45 provide redundancy in case of failure or impaired functioning of other vacuum relief valves 45. Furthermore, the provision of plural vacuum relief valves 45 relatively improves the vacuum flow capacity of the valve apparatus 41. Furthermore, the flow capacity for each of pressure relief and vacuum relief is different in the present embodiment. As will be appreciated by one skilled in the art the total flow through area of the vacuum relief valves relative to the total flow through area of the pressure relief valve may be selected according to the application to which the valve apparatus 41 is intended for use. Accordingly, the number of and/or flow through area of one or more of the vacuum relief valves 45 may be altered dependent on the desired vacuum relief and venting requirements.

By removably attaching parts 462*d* of the end wall 462*c* of the second extension 462 it is possible to readily and rapidly remove one or more of the vacuum relief valves 45 or to inspect said one or more vacuum relief valves 45.

In embodiments there may be only one vacuum relief valve 45 or there may be more than two vacuum relief valves, for example 3, 4, 5 or any suitable number. In embodiments the second extension 462 may comprise a single vacuum chamber, for example which may extend around the periphery of the second extension. In embodiments one or more of the plural vacuum relief valves 45 may have a different second pressure to the other valve or valves 45, for example the mass m may be different and/or the surface area of the valve pallet may be different. In this way one or more vacuum relief valve 45 may open once an initial second pressure has been reached, whilst one or more other vacuum relief valves may open once a further second pressure has been reached.

It will be appreciated by one skilled in the art that the vacuum relief valve 45 may be in a form of one single annular ring. That is, the pallet and seat of the vacuum relief valve 45 is in a form of annular ring.

Figure 19:
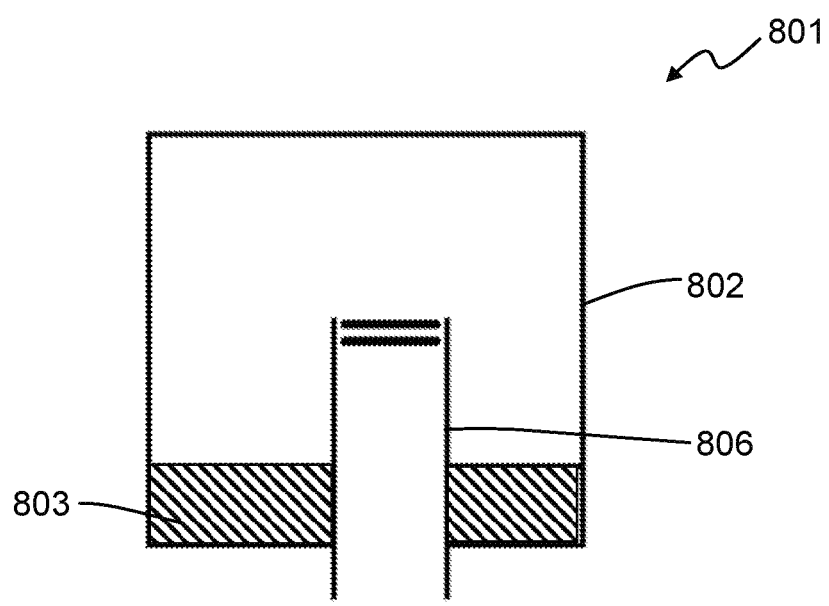
FIG. 19 is sectional view of a valve apparatus integrated with a flame arrester according to a further embodiment of the invention.

Referring now to FIG. 19, there is shown a valve apparatus integrated with a flame arrester 801 (hereinafter referred to as a valve apparatus 801) according to a further embodiment of the invention, wherein like features to those described in respect of the valve apparatus 1 shown in FIG. 2 are denoted by like references preceded by an "80", which will not be described further herein. The valve apparatus 801 shown in FIG. 19 differs from that shown in FIG. 2 in that the flame arrester element 803 extends radially from the first conduit 806 in an eccentric or asymmetric manner (e.g. the first conduit 806 is located eccentrically within the housing 802).

It will be appreciated by those skilled in the art that several variations to the aforementioned embodiments are envisaged without departing from the scope of the invention. For example, although valve apparatus 1, 11, 21, 31, 41, 801 are described as including a flame arrester element this need not be the case and instead they may be absent a flame arrester element. Where a valve apparatus without a flame arrester element is provided the first conduit and extension may comprise a unitary structure and/or may be relatively reduced in size, e.g. in length or height. Additionally or alternatively, the housing may be relatively reduced in size, e.g. in length or height. Additionally or alternatively, a fluid permeable screen or barrier may be provided between the first conduit and the housing, for preventing the ingress of objects or organic matter (such as birds and insects) into the valve apparatus.

Additionally or alternatively, the housing of any of the above described valve apparatus may have any suitable shape. Additionally or alternatively, the guides of the first, pressure relief valve or the second, vacuum relief valve of any of the above described valve apparatus may include a cylinder attached to the valve and a stem attached to the housing or a biasing plate. Additionally or alternatively, more than one guide may be provided on one or each valve, for example 2, 3 or 4 guides. Additionally or alternatively, any of the valve apparatus may include pressure and/or vacuum relief valves which are biased by a mass and/or one or more spring, for example biased toward a closed condition or position. Additionally or alternatively, any of the above described valve apparatus may comprise an air cushion seal with a diaphragm for providing a fluid tight seal between the valve pallet and valve seat of one or both of the valves.

Any or all of the valve apparatus described above may be provide with a housing which comprises a removable cover, for example for maintenance purposes. Additionally or alternatively one or more of the valve apparatus may comprise one or more of a solids trap, for example to remove entrained solid particulates from a gas or vapour flow, a liquid drain, for example to remove entrained liquids from a gas or vapour flow, cleaning means, for examples nozzles arranged, preferably, to periodically discharge, e.g. to force, a cleaning medium into the housing.

It will also be appreciated by those skilled in the art that any number of combinations of the aforementioned features and/or those shown in the appended drawings provide clear advantages over the prior art and are therefore within the scope of the invention described herein.

The invention claimed is:

1. A valve apparatus for connection to a tank or pipe, the valve apparatus comprising a housing, the housing comprising a closed end wall and a side wall extending from the periphery of the end wall to an opposite end, the valve apparatus further comprising a first opening and a second opening communicating with respective first and second conduits each for providing ingress and egress of fluid into and out of the housing through the first opening and the second opening, the side wall at least partially defining the second conduit and the second opening being at the opposite end of the side wall, the opening of the second conduit completely surrounds the first conduit in a radial direction, the housing containing discrete first and second valves which are spaced apart from one another, the first and second valves selectively controlling fluid flow between the first and second conduits, wherein, in use, a first fluid flow path along a first principal flow axis of the first conduit and a second fluid flow path along a second principal flow axis of the second conduit are parallel and opposed, the first and second fluid flow paths extending between the first and second openings, the first valve is configured to open when a pressure in the first conduit is greater than a first pressure and the second valve is configured to open when a pressure in the first conduit is less than the first pressure.

2. The valve apparatus according to claim 1, wherein the side wall extends continuously from the periphery of the end wall to the opposite end.

3. The valve apparatus according to claim 1, wherein the first and second conduits are coaxial.

4. The valve apparatus according to claim 1, wherein the second conduit is defined at least partially by the first conduit.

5. The valve apparatus according to claim 1, wherein the first and second valves are vertically and/or horizontally spaced apart from one another.

6. The valve apparatus according to claim 1, wherein the first valve comprises a first valve pallet and the second valve comprises a second valve pallet, the first valve pallet and the second valve pallet extending in the same plane or parallel to one another.

7. The valve apparatus according to claim 1, comprising a diversion barrier extending between the first conduit and the housing and configured to occlude at least a portion of the second conduit.

8. The valve apparatus according to claim 7, wherein the diversion barrier provides at least part of a diversion path for fluid flowing from the first opening to the second opening or from the second opening to the first opening.

9. The valve apparatus according to claim 1, wherein the first conduit has a second end, and further comprising an extension extending from the second end of the first conduit.

10. The valve apparatus according to claim 9, wherein the extension is configured to define a flow path between the first conduit and one of the first and second valves, where the flow path bypasses the other of the first and second valves.

11. The valve apparatus according to claim 1, wherein the flow path between the first opening and the second opening is shorter in out-breathing mode than in in-breathing mode.

12. The valve apparatus according to claim 1, wherein the end wall is openable.

13. The valve apparatus according to claim 1, comprising cleaning nozzles.

14. The valve apparatus according to claim 13, wherein said cleaning nozzles are located on the end wall.

15. The valve apparatus according to claim 1, further comprising a flame arrester element located at least partially in the second conduit.

16. The valve apparatus according to claim 15, wherein the flame arrester element completely surrounds a portion of the first conduit in the radial direction.

17. A valve apparatus, the valve apparatus comprising a housing having an end wall and a side wall and a first opening for connection to a tank or pipe and a second opening, the first and second openings communicating with respective first and second conduits each for providing ingress and egress of fluid into and out of the housing through the first opening and the second opening, and discrete first and second valves which are spaced apart from one another, the first and second valves selectively controlling fluid flow between the first and second conduits, the first conduit having a first end which is connectable to the tank or pipe and a second end which is located within the housing, a flame arrester element within the second conduit and provided about the first conduit, the flame arrester element extending from the first conduit to an interior surface of the side wall and wherein the first valve is located relatively further from the first end of the first conduit than the second valve.

* * * * *